United States Patent
Gould et al.

(10) Patent No.: US 10,365,977 B1
(45) Date of Patent: Jul. 30, 2019

(54) FLOATING BACKUP POLICIES IN A MULTI-SITE CLOUD COMPUTING ENVIRONMENT

(71) Applicant: EMC IP Holding Company LLP, Hopkinton, MA (US)

(72) Inventors: Kenneth Mark Gould, Rochestown (IE); John Currie, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 368 days.

(21) Appl. No.: 15/085,173

(22) Filed: Mar. 30, 2016

(51) Int. Cl.
    *G06F 16/27*    (2019.01)
    *G06F 11/14*    (2006.01)
    *H04L 29/08*    (2006.01)

(52) U.S. Cl.
    CPC .......... *G06F 11/1464* (2013.01); *G06F 16/27* (2019.01); *H04L 67/1095* (2013.01); *G06F 2201/85* (2013.01)

(58) Field of Classification Search
    CPC ........... G06F 9/546; G06F 9/455; G06F 16/27
See application file for complete search history.

(56) References Cited

U.S. PATENT DOCUMENTS

| | | | |
|---|---|---|---|
| 2008/0025230 A1* | 1/2008 | Patel | H04L 41/5022 370/252 |
| 2014/0143200 A1* | 5/2014 | Brown | G06N 5/048 706/48 |
| 2015/0113150 A1* | 4/2015 | Jackson | G06F 9/5027 709/226 |
| 2016/0048408 A1* | 2/2016 | Madhu | G06F 11/1458 718/1 |

* cited by examiner

*Primary Examiner* — Mariela Reyes
*Assistant Examiner* — Courtney Harmon
(74) *Attorney, Agent, or Firm* — Staniford Tomita LLP

(57) ABSTRACT

A first hardware island is defined as including at least a first compute cluster. First backup infrastructure is associated with the first compute cluster. A second hardware island is defined as including at least a second compute cluster. Second backup infrastructure is associated with the second compute cluster. A partnership is established between the first and second compute clusters. A selection of a backup policy to be associated with a workload is received. The workload is provisioned to the first compute cluster for processing and the selected backup policy is provided to the second backup infrastructure.

19 Claims, 14 Drawing Sheets

FLOATING BACKUP POLICIES IN A MULTI-SITE CLOUD COMPUTING ENVIRONMENT

CROSS-REFERENCE TO RELATED APPLICATIONS

This application is related to co-pending U.S. patent application Ser. No. 15/085,234, and 15/085,292, all filed Mar. 30, 2016, which are incorporated by reference along with all other references cited herein.

TECHNICAL FIELD

Embodiments are generally directed to providing cloud computing services, and more specifically to providing such services in a cloud environment having multiple cloud computing sites.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

"Cloud computing" typically refers to the use of remotely hosted resources to provide services to customers over one or more networks such as the Internet. Resources made available to customers are typically virtualized and dynamically scalable. Cloud computing services may include any specific type of application, database, or both (e.g., Microsoft Exchange, Microsoft SQL Server, Microsoft SharePoint, Oracle, or SAP). Cloud computing services may be provided to customers through client software such as a Web browser (e.g., Google Chrome, Microsoft Internet Explorer, Microsoft Edge, or Apple Safari).

The software and data used to support cloud computing services may be located on remote servers owned by a cloud computing service provider. In some cases, customers consuming services offered through a cloud computing platform do not own the physical infrastructure hosting the actual service, and may accordingly avoid capital expenditure on hardware systems by paying only for the service resources they use, a subscription fee, or both. In other cases, customers may own and operate their own cloud computing network, but may have a desire to access another cloud computing network (e.g., public cloud) for additional resources such as in a hybrid cloud configuration.

From a service provider's standpoint, the sharing of computing resources across multiple customers or "tenants" improves resource utilization. Use of the cloud computing service model has been growing due to the increasing availability of high bandwidth communication, making it possible to obtain response times from remotely hosted cloud-based services similar to those of services that are locally hosted.

Demands are dictating the delivery of greater speeds and agility, while reducing costs and minimizing risks. When deploying equipment within a cloud computing environment, converged infrastructure provides organizations with a way to minimize compatibility issues between servers, storage systems and network devices while also reducing costs for cabling, cooling, power and floor space. Converged infrastructure operates by grouping multiple information technology (IT) components into a single, optimized computing package. Components of a converged infrastructure may include servers, data storage devices, networking equipment and software for IT infrastructure management, automation and orchestration. Organizations including IT organizations and enterprises use converged infrastructure to centralize the management of IT resources, to consolidate systems, to increase resource-utilization rates, and to lower costs.

The tight integration of compute, storage, and network within a piece of converged infrastructure offers both advantages and disadvantages. One advantage is that infrastructure can be deployed very quickly and easily because all the internal components have already been pre-cabled, tested, and integrated. The tight integration, however, also means that resources within a piece of converged infrastructure are generally not available to another piece of converged infrastructure.

This lack of access can present problems in cases where there are multiple pieces of converged infrastructure in a site or across multiple sites. The isolated design of converged infrastructure prevents or hinders the application of many data protection and backup techniques. Attempting to provision storage to a cluster in one piece of converged infrastructure using a storage from another piece of converged infrastructure will present problems because the compute in the former piece of converged infrastructure cannot access storage in other converged infrastructure.

There is a need to provide improved systems and techniques for managing a cloud computing environment that may include multiple pieces of converged infrastructure equipment.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
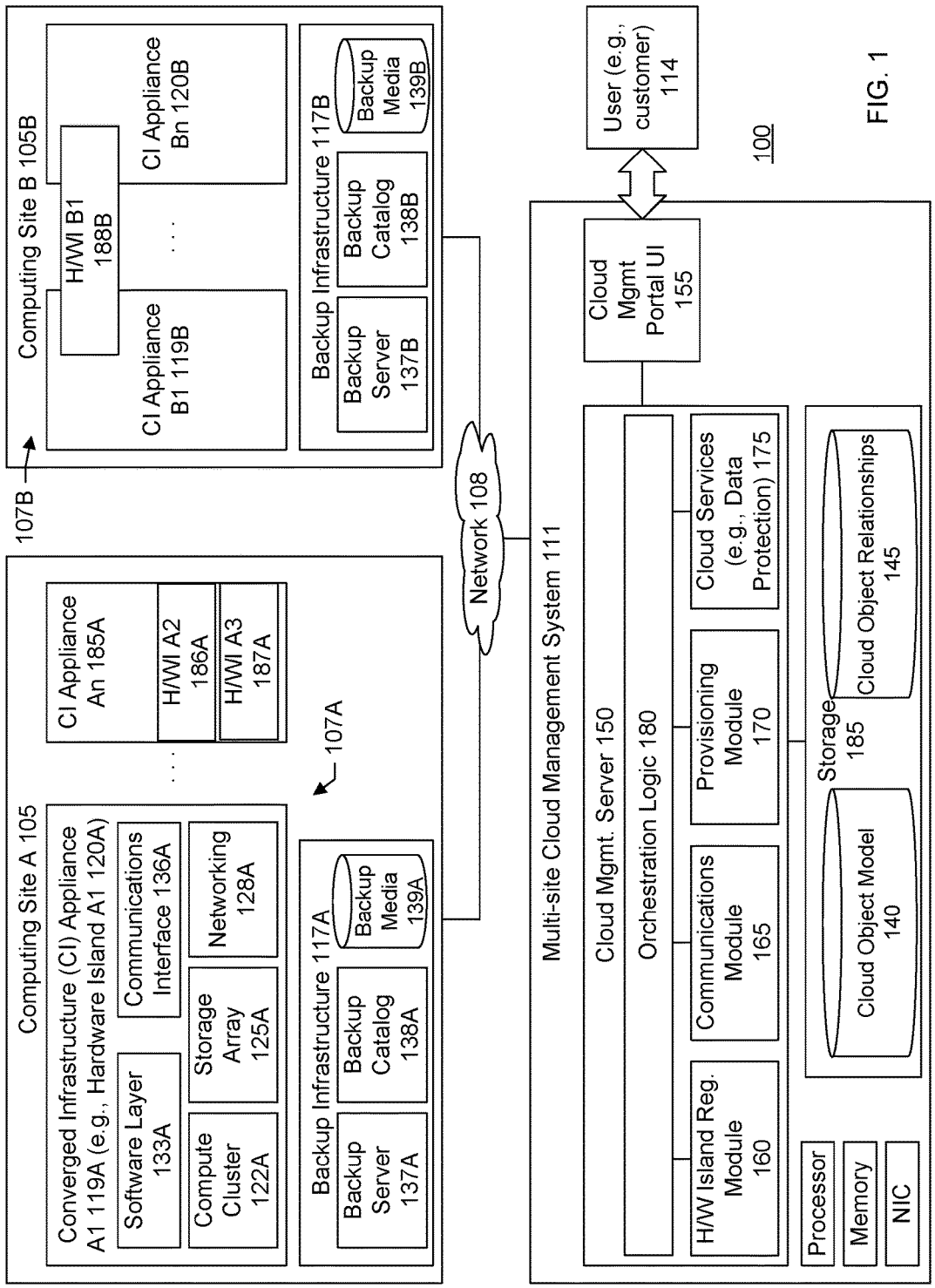
FIG. 1 is block diagram showing a cloud computing environment under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for providing cloud computing services in a cloud environment. The cloud environment may include multiple cloud computing sites or data centers, where each site may include any number of converged infrastructure appliances. The cloud environment may include any combination of on-premises computing networks, private cloud networks, or public cloud networks.

FIG. 1 illustrates a cloud computing environment 100 having multiple computing sites including a first computing site A 105A, and a second computing site B 105B. Although two computing sites are shown in the example of FIG. 1, it should be appreciated that an environment may include any number of computing sites. In a specific embodiment, a site is on-premises of the user or customer or a private cloud computing site owned by the user or customer. In another specific embodiment, the site may be a public cloud computing site owned by a third-party. The computing sites are connected via a network 108 to a multi-site cloud management computer system or platform 111. The cloud management system allows a user or customer 114 to provision and consume cloud resources and services.

Each site includes a set of converged infrastructure (CI) appliances and a set of backup infrastructure for backups. Specifically, site 105A includes a first set 107A of CI appliances A1-An, and first backup infrastructure 117A. The first backup infrastructure is responsible for backing up workloads processed at the first site. Site B includes a second set 107B of CI appliances B1-Bn, and second backup infrastructure 117B. The second backup infrastructure is responsible for backing up workloads processed at the second site. A site may also include non-converged infrastructure such as individual servers, storage systems, network devices, and so forth. The system supports, in addition to CI appliances, non-converged infrastructure components. A hardware island, discussed below, can be made up of BYO (bring-your-own) components in which the customer supplies their own pre-existing components.

The backup infrastructure such as the first backup infrastructure may include a backup server 137A, a backup catalog 138A, and backup media 139A. The backup server is responsible for managing backups of workloads being processed at the respective site. The backup server can coordinate with the CI appliance, backup catalog, and backup media to backup (and restore) workloads. There can be multiple backup servers depending, for example, on the amount of data to be backed up. The backups are stored on the backup media. The backup catalog provides an index of the backups stored on the backup media. The index may include metadata associated with a backup such as a name of the backup, time and date of the backup, source of the backup, location of the backup, and so forth.

In a specific embodiment, backups are performed according to a user-selected backup policy. The backup policy specifies parameters for a backup such as a backup schedule, window, or time that the backup should be performed, frequency of backup (e.g., hourly, daily, or weekly), backup source (e.g., image, folders, files, or combinations of these that should be backed up), retention period (e.g., length of time or duration that a backup should be kept), compression options, deduplication options, other parameters, or combinations of these. Backups allow an organization to rollback to a specific point-in-time.

Generally, a CI appliance, such as a CI appliance 119A, includes built-in compute 122A, storage 125A, networking 128A, a software layer 133A, and a communications interface 136A. Compute may include a compute server or node or a compute cluster including multiple compute nodes. Storage may include one or more storage arrays or mass storage devices. Storage may include, for example, flash drive, solid-state drive (SSD), serial ATA (SATA) drive, serial attached SCSI (SAS) drive, near line SAS (NL-SAS) drive, or combinations of these.

Networking may include switches, routers, or both to exchange communications and data between the compute and storage. The software layer includes virtualization software. The virtualization software may be used to create, run, and manage virtual machines on the compute clusters, create logical representations of storage, or both. The communications interface provides for exchanging communication between the CI appliance and, for example, the multi-site cloud management system, backup infrastructure, or both. Communications may be through an application programming interface (API).

The components of the CI appliance such as the compute, storage, and networking are pre-cabled, bundled, and packaged together as a tightly integrated unit inside the appliance. A CI appliance may be referred to as a hyper-converged infrastructure appliance. In hyper-converged infrastructure, storage and compute are served by the same set of hardware. In other words, there are a set of servers in a rack that simultaneously provide both storage and compute. In a converged infrastructure, sets of servers and storage arrays are cabled together in the rack. In an embodiment, a CI appliance includes a single physical chassis, cabinet, box, or case that houses the compute, storage, and networking components.

A CI appliance decreases the complexity of deploying resources in a data center because there are fewer components for the user (e.g., administrator user) to configure, test, manage, and maintain as compared to deployments in which compute, storage, and network are separate components. Packaging and integrating compute nodes, storage, and network as a single unit facilitates deployment because a user does not have to purchase individual compute nodes, storage, and network, determine how the components should be cabled together, install communication packages, and determine how the components should communicate with each other.

For example, a vendor of a CI appliance typically pre-configures and pre-tests the compute, storage, and networking and other components. This helps to ensure that each component will operate properly with another component in the CI appliance and that there are no compatibility issues. Further, since a CI appliance is typically supported by a single vendor, the user can manage the appliance as a single system or through a single interface.

Due to the tight integration between components in a CI appliance, resources in a CI appliance are typically not available to another CI appliance. For example, a storage array in one CI appliance is generally not available to a compute cluster in another CI appliance. Generally, this does not present a problem for organizations that may need just a single CI appliance. Other organizations or enterprises, however, may wish to deploy multiple (e.g., two or more) CI appliances to a single site or across multiple sites. For example, a single CI appliance may lack the capabilities to service a large and complex enterprise. Specifically, there are needs to have data protection capabilities such as disaster recovery, fail-over, continuous availability, and other data protection techniques to ensure that workloads are protected across redundant sets of hardware.

Data protection techniques to allow an organization to continue operations after or even during a disruptive event with little or no impact to the overall functioning of the organization. Examples of disruptive events includes natural disasters (e.g., earthquake or hurricane) or computer viruses. Specifically, disaster recovery can refer to a process where the organization resumes business after the disruptive event. Continuous availability can refer to a process where the organization is able to continue operations during a disruptive event.

A difference between backup and data protection is that data protection can involve replication in real or near-real time whereas backups are typically performed according to a backup schedule (e.g., nightly backups). Backups allow for rollbacks to particular points in time. Data protection and backups are both desirable. For example, as discussed above, data protection services help to ensure that an organization can continue operations after or even during a disruptive event. However, if for example a user accidentally deletes an important file, that deletion may be replicated by a data protection service. Having backups may allow for the recovery of the file if the file was backed up before it was deleted.

Provisioning, backing up, and providing data protection in an environment including multiple CI appliances is problematic because, as discussed above, resources in a CI appliance are typically not available to another CI appliance. For example, provisioning storage to a compute cluster in one CI appliance where a storage array happens to be in another CI appliance will cause problems since the compute cluster in the one CI appliance is not able to access the storage array in the other CI appliance.

To address these challenges, the multi-site cloud management system includes an object model 140 and relationship mappings 145 to control the protection logic to ensure that workloads are protected across redundant sets of hardware. In a specific embodiment, the object model provides a set of objects that may be referred to as hardware islands. Through the hardware islands, the model provides users, such as administrative users, a very flexible approach to tracking resources within a CI appliance, across multiple CI appliances, within a site, or across multiple sites.

Hardware islands provide an understanding of multiple pieces of infrastructure on a site including components integrated into a CI appliance and individual components not integrated into a CI appliance (e.g., server components separated from storage components). Understanding hardware islands, the sites, and how each interact with each other helps to enable redundancy in protecting workloads.

In a specific embodiment, a site further includes a set of backup infrastructure. There is no link between a hardware island and backup infrastructure. Hardware islands are not aware of whether backup infrastructure is present or not. Likewise backup infrastructure is not aware of the presence of one or multiple hardware islands. Subcomponents of different hardware islands (clusters) may share the same backup infrastructure based on being on the same site. For example, a site may include a first hardware island, a second hardware island, and backup infrastructure. The first hardware island may include a first cluster. The second hardware island may include a second cluster. The backup infrastructure can provide backups for both the first and second cluster.

Specifically, a hardware island may be defined as being a single CI appliance. For example, there can be a one-to-one relationship between CI appliance A1 119A and a hardware island A1 120A. A single hardware island may correspond to a single CI appliance. However, this is not necessarily always the case as the model is very flexible. In particular, a single CI appliance (or more specifically resources within the single CI appliance) may be carved, divided, or separated into multiple, e.g., two or more, hardware islands.

For example, a CI appliance 185A may include a hardware island A2 186A and a hardware island A3 187A. A single hardware island may be defined or registered as including at least portions of two or more CI appliances. For example, second site B 105B includes a CI appliance B1 119B and a CI appliance Bn 120B. A hardware island B1 188B has been registered as including at least a portion of CI appliance B1 and at least a portion of CI appliance Bn.

The ability to separate a CI into multiple hardware islands allows for a dedication of resources. Having the ability to dedicate resources allows workloads to be tiered depending upon priority, importance, and so forth. For example, in some case a user may desire to associate certain types of workloads to be processed by dedicated parts of infrastructure within a CI appliance and not allow the resources to be shared with any other workloads on the appliance. In particular, there can be higher performance requirements for critical or essential workloads as compared to other less critical workloads.

Critical workloads may be given, for example, dedicated pools of storage in order to guarantee that the storage is available to those workloads and will not be consumed by other workloads. A workload can refer to a logical abstraction of the work that an instance or set of instances on a compute cluster is to perform. An instance can be a copy of an executable version of a program or code module that has been copied from storage and written into memory. A workload may include an instance of an application, service, or code module that can be executed. Some examples of workloads include workloads for invoice and transaction processing, business intelligence analytics, business productivity services (e.g., email), enterprise resource planning (ERP) applications, a virtual storefront or e-commerce site, and so forth.

Multiple CI appliances may be located in a single site or across multiple sites. The object model provides a representation or modeling of the physical infrastructure of the cloud environment including the resources within CI appliances and their boundaries. The model facilitates the control of protection logic to ensure that workloads are protected across redundant sets of hardware.

In a specific embodiment, the system stores relationship mapping and type information. The relationship mapping can identify a pair of compute clusters. A pair of compute clusters can be used to provide redundancy. For example, a first cluster of a pair may be in a first hardware island. A second cluster of the pair may be in a second hardware island, separate from the first hardware island. The first and second hardware islands may be in first and second separate CI appliances, respectively. The first CI appliance may be geographically located at a first site. The second CI appliance may be geographically located at a second site, remote from the first site. For example, the first site may be located in Newark, N.J. and the second site may be located in New York City. The first site may be located in San Francisco, Calif. and the second site may be located in Eastport, Me.

In a specific embodiment, the object model and relationships are consulted, accessed, or reviewed to help ensure that the appropriate resource types are provisioned (e.g., protected or replicated storage and the type of protection); to support data protection techniques such as replication, continuous availability, or failover; that a cluster will be able to access the storage; and to help ensure that backups of a workload are accessible regardless of where the workload might have been processed.

Network 108 may be a cloud network, LAN, WAN or other appropriate network. The network provides connectivity to the various systems, components, and resources of system 100, and may be implemented using protocols such as Transmission Control Protocol (TCP) and/or Internet Protocol (IP), well known in the relevant arts. In a distributed network environment, the network may represent a cloud-based network environment in which applications, servers, and data are maintained and provided through a centralized cloud computing platform. In an embodiment, the system may include a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The multi-site cloud management system or platform may include one or more server systems. A server may include familiar computer components such as a hardware processor, memory, mass storage devices, input/output (I/O) controller, display adapter, network interface card (NIC), ports, and the like. The one or more server systems may be responsible for receiving requests from the client or customer user, performing processing required to satisfy the requests, communicating with the different computing sites, and forwarding results corresponding to the requests back to the requesting client. The multi-site cloud management system executes executable code (or computer-readable code) that embodies a technique or algorithm as described herein.

In a specific embodiment, the multi-site cloud management system includes a cloud management server 150 and a cloud management portal user interface (UI) 155. In a specific embodiment, the management portal UI is displayed within a web browser executing on a client computer workstation. The user or customer accesses the multi-site cloud management system via the browser through a network such as the Internet.

The portal UI presents the user or customer with a graphical user interface (GUI) that includes a self-service catalog. The self-service catalog allows the user to perform configuration, provisioning, and management tasks. Configuration tasks may include registering a site, registering or defining a hardware island, registering compute clusters from a CI appliance to a hardware island, assigning cluster types to compute clusters within a hardware island, and establishing relationships based on the cluster types. Provisioning tasks may include provisioning storage, workloads, selecting storage protection levels, selecting data protection services, selecting backup policies, and so forth. Management tasks may include pausing processing of a workload, moving a workload, failing over a workloads, failing back a workload, viewing system status, and so forth.

In a specific embodiment, the management portal lists or displays on an electronic screen the various cloud services and options that are available. The customer can select or pick-and-choose from the catalog the desired services and view status and performance. For example, the customer can select options for provisioning machines (e.g., virtual machines), workloads, and storage, choose various templates from which to provision machines, specify a number of machines to be provisioned, processors, memory, storage, applications and operating systems to install (e.g., Windows Server 2012, Linux), select desired service levels, protection and backup policies, specify machine lifecycle, and so forth. Instead or additionally, commands may be received via a command line interface, application program interface (API), or both.

Figure 2:
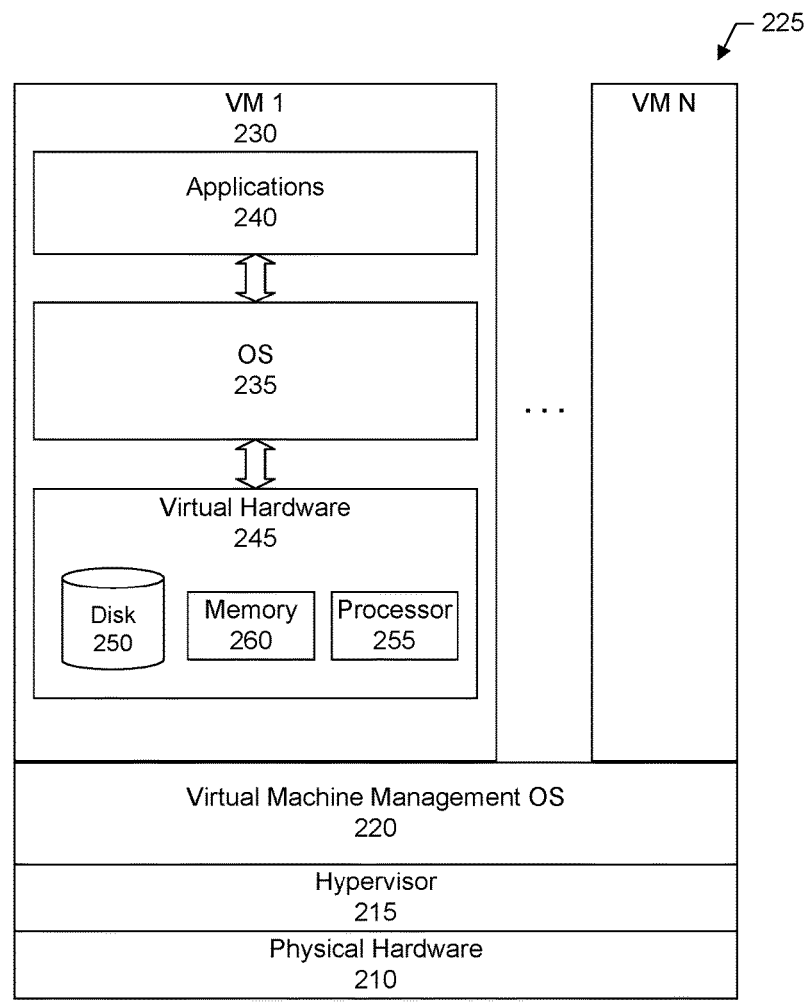
FIG. 2 is a block diagram showing an example of a compute node hosting virtual machines to process workloads.

As an example, FIG. 2 shows a block diagram of a compute node or host 205 that may be located within a hardware island. The node or host includes physical hardware 210, virtualization software such as a hypervisor 215 and a virtual machine management operating system 220, and a set of virtual machines 225 that may be provisioned by the cloud management system. The virtual machines can process customer workloads.

The physical hardware may include a processor, storage, input/output (I/O) controller, network interface, and memory each of which may be interconnected by a bus architecture or any interconnection scheme. The host hosts any number of virtual machines (e.g., VM 1 . . . VM N). For example, there can be a single virtual machine or multiple virtual machines (e.g., two or more virtual machines). The host uses virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform.

A virtual machine 230 may include a guest operating system 235, guest applications 240 running on the guest operating system, and virtual hardware 245 which represents a hardware state of the virtual machine. Virtual hardware refers to the hardware resources allocated to the virtual machine and is mapped to the hardware platform. The virtual hardware may include a virtual disk 250, virtual processor 255, virtual system memory 260, and various virtual devices for which the guest OS, virtual machine management OS, or both includes corresponding drivers. Virtual devices may include, for example, a virtual graphics adapter, a virtual network adapter, a virtual input/output (I/O) device, or the like. Each virtual machine may be assigned an identifier such as an Internet Protocol (IP) address, globally unique identifier (GUID), or both.

Referring back now to FIG. 1, the cloud management server may include any number of modules, code components, logic, application programs, services, or combinations of these. In the example shown in FIG. 1, the cloud management server includes a hardware island registration module 160, a communications module 165, a provisioning module 170, data protection services 175, and an orchestration logic 180.

The registration module is responsible for registering or on-boarding hardware islands, registering clusters with hardware islands, and so forth. A cluster may be a logical grouping of compute nodes in a single CI appliance or two CI appliances (e.g., stretch cluster). In a specific embodiment, properties of a hardware island include a system-generated identifier, a user-supplied name of the hardware island, site that the hardware island belongs to, and virtual arrays associated with the hardware island.

The registration information is stored in the cloud object model in storage 185. The registration information may include, for example, information identifying a hardware island, a site at which the hardware island is located, one or more compute clusters within the hardware island, a cluster type assigned to a compute cluster within the hardware island, one or more storage arrays within the hardware island, which compute cluster has access to which storage array within the hardware island, a geographical location of the site at which the hardware island is located, logical abstractions of storage available on the one or more storage arrays within the hardware island (e.g., tier 1 storage, tier 2 storage, gold storage, silver storage, bronze storage, high performance storage, performance storage, economy storage), backup infrastructure at a site that is associated with a compute cluster, or combinations of these.

The registration information may further include relationship information that is received and stored in database 145. The relationship information may be based on the cluster types that a user has assigned to the various compute clusters during the registration process. The cluster types can be used to help drive the type of storage to be provisioned and data protection services. In a specific embodiment, the cluster types include local-only, disaster recovery (DR), continuous availability (CA), and 3-site data protection. The model allows the definition of any number of cluster types.

In this specific embodiment, a local-only cluster type refers to a compute cluster that is not subscribed to or associated with any data protection services. For example, the compute cluster may host workloads for development or testing purposes rather than production purposes. In this case, the user may wish to conserve resources and expenditures by not subscribing or using the data protection services that may be offered.

The disaster recovery, continuous availability, and 3-site data protection cluster types refer to compute clusters that are protected by data protection services or a data protection application. The data protection application can offer different types, levels, or degrees of data protection based on the cluster type. Further discussion is provided below.

The communications module is responsible for directing communications between the cloud management server and cloud computing sites. The communications module can access the stored object model and relationships to identify hardware islands, clusters, and storage arrays, issue queries, requests, commands, or instructions, and so forth.

The provisioning module is responsible for provisioning operations such as provisioning storage, workloads, and so forth.

The data protection module is responsible for providing data protection services to the workloads running on the compute clusters. Data protection services may include, for example, disaster recovery services or continuous availability services.

The orchestration logic coordinates the tasks of the registration, communications, provisioning, and data protection service modules. It should be appreciated that the modules shown in FIG. 1 can be functional entities where implementation of the functions may vary. For example, in some cases the communications module and orchestration logic are combined into one code module. In other cases, the communications module and orchestration logic reside in separate code modules.

Figure 3:
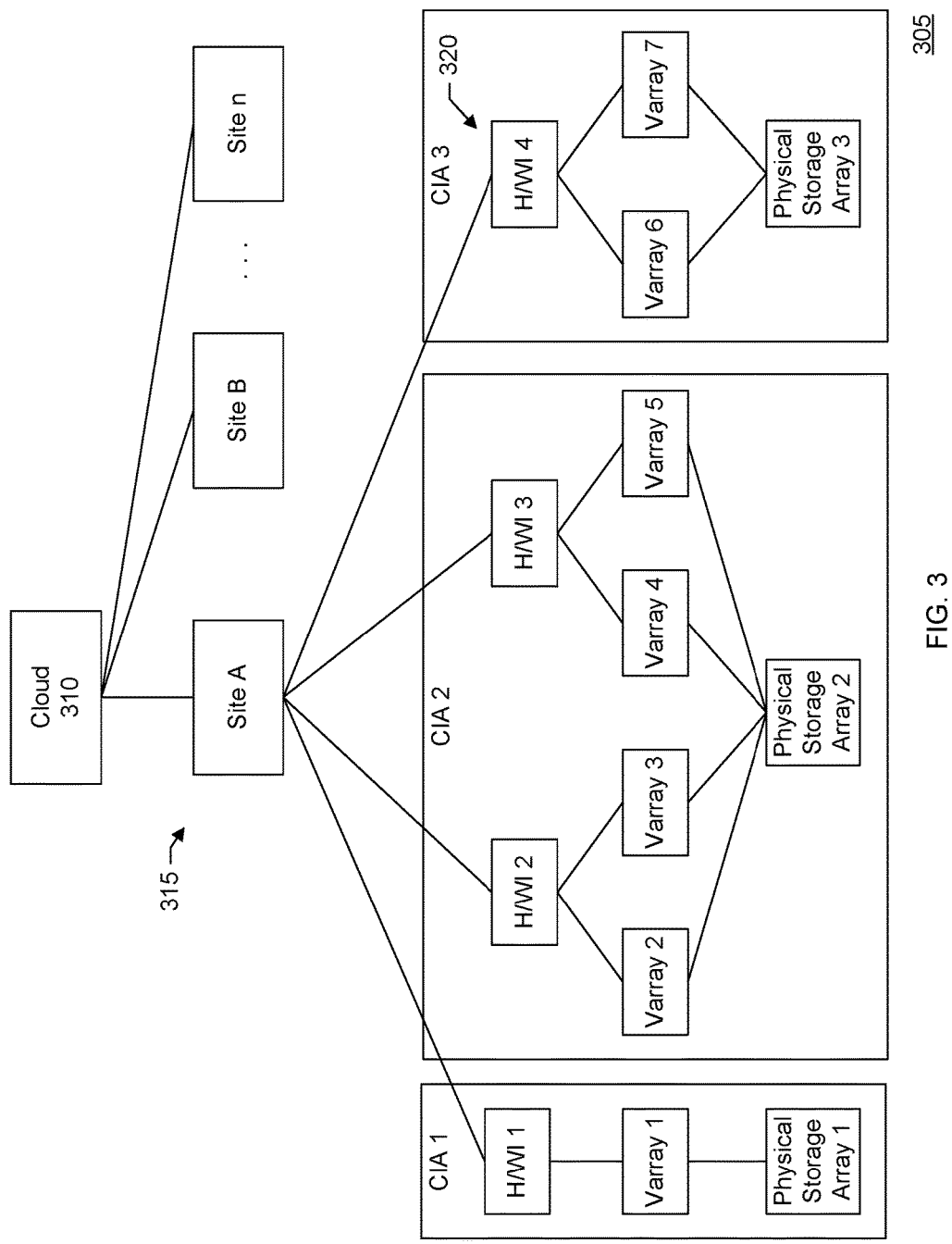
FIG. 3 is a block diagram showing virtual arrays mapping to physical storage according to a specific embodiment.

FIG. 3 shows a schematic or hierarchical representation of objects or entities in a cloud object model 305 with respect to storage. In the example shown in FIG. 3, there is a cloud 310, cloud computing sites 315, and hardware islands 320.

In this specific embodiment, sites are members of a cloud. For example, sites A, B . . . n are members of cloud 310. Hardware islands are members of a site. For example, hardware islands 1-4 are members of site A. As discussed, there can be a one-to-one relationship between a hardware island and a CI appliance. Alternatively, a CI appliance may be carved into two or more hardware islands.

In the example shown in FIG. 3, site A includes CI appliances 1-3. CI appliance 1 includes hardware island 1 and storage array or physical storage array 1. CI appliance 2 includes hardware islands 2 and 3, and storage array 2. CI appliance 3 includes hardware island 4 and storage array 3.

A hardware island connects to a physical storage array through a virtual array (Varray). Thus, the same storage array can provide storage to one or more virtual arrays and each virtual array may be in the same or different hardware islands. The lack of direct mapping between a hardware island and a physical storage array provides for a great degree of flexibility in managing storage resources. In the example shown in FIG. 3, a virtual array 1 is between hardware island 1 and storage array 1. Virtual arrays 2 and 3 are between hardware island 2 and storage array 2. Virtual arrays 4 and 5 are between hardware island 3 and the same storage array 2. In other words, two hardware islands may use the same physical storage array. Virtual arrays 6 and 7 are between hardware island 4 and storage array 3.

In various specific embodiments, one hardware island may connect to one virtual array which in turn connects to one physical storage array. One hardware island may connect to two or more virtual arrays which in turn connect to one physical storage array. One hardware island may connect to two or more virtual arrays which in turn connect to two or more physical storage arrays. Two or more hardware islands may use the same physical storage array. It is not necessary that a storage array be bound to a single hardware island.

In a specific embodiment, storage is abstracted to provide different types or levels of storage service offerings. For example, different storage arrays can have different disk types (e.g. flash, SAS, or NL-SAS) or combinations of different disk types. Flash-based storage or solid-state drives (SSD) generally offer higher performance than near line serial attached SCSI (NL-SAS) drives. Flash storage, however, is generally more expensive than NL-SAS. In other words, the cost per gigabyte can be much higher for flash than NL-SAS. More particularly, there can be a first storage service offering labeled "tier 1," "gold," or "high performance," to indicate storage including flash. There can be a second storage service offering labeled "tier 2," "silver," or "performance," to indicate storage including a combination of flash and SAS. There can be a third storage service offering labeled "tier 3," "bronze," "capacity," or "economy" to indicate storage including NL-SAS. Storage may be grouped or tiered using any classification scheme.

Figure 4:
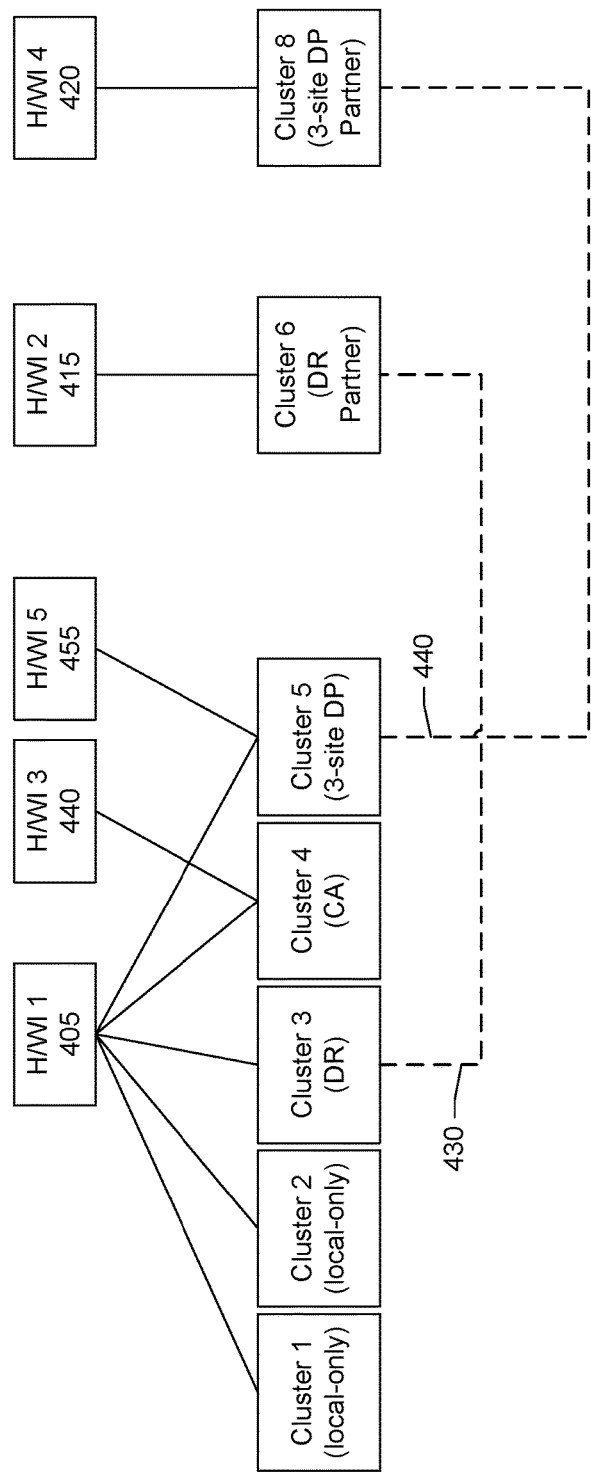
FIG. 4 is a block diagram showing relationships between compute clusters in hardware islands according to a specific embodiment.

FIG. 4 is a block diagram showing compute cluster types and relationships that can be established or created and stored. In a specific embodiment, cluster type and relationships are used to provide various types of data protection for workloads to be processed by the clusters. In the example shown in FIG. 4, a first hardware island 405 includes compute clusters 1-5 registered with the first hardware island. A second hardware island 415 includes a sixth compute cluster registered with the second hardware island. A third hardware island 440 includes also the fourth compute cluster registered with the third hardware island. A fourth hardware island 420 includes an eighth compute cluster registered with the fourth hardware island. A fifth hardware island 455 also includes the fifth compute cluster registered with the fifth hardware island.

The first and second clusters have been defined or designated as cluster type "local-only." Cluster types that are local-only indicate that the user has opted to exclude the clusters from the data protection services.

The third, fourth, and fifth clusters have been designated for data protection services. Specifically, the third cluster is of type "disaster recovery" ("DR"). The fourth cluster is of type "continuous availability" ("CA"). The fifth cluster is of type "3-site data protection" ("3-site DP"). Thus, multiple compute clusters may be in the same hardware island. The compute clusters can be of the same or different types. It should be appreciated that the number of clusters and cluster types shown as being defined within the first hardware island is merely an example. As discussed, the model and hardware islands are flexible. For example, a hardware island may be defined to include one or two or more clusters. There can be any number of clusters defined to be within a hardware island (e.g., three, four, five, six, seven, eight, nine, ten, or more than ten clusters). The two or more clusters may be of the same type (e.g., local-only). Alternatively, the two or more clusters may be of different types (e.g., local-only and disaster recovery).

For example, two clusters may be parts of a hardware island. Clusters are parts of a hardware island by definition (governed by the clusters physical connections). Each of the two clusters may be of the same or different type. As another example, three clusters may form parts of another hardware island. Two of the three clusters may be of a first cluster type. The remaining cluster may be of a second cluster type, different from the first cluster type. As another example, four clusters may form parts of another hardware island. One cluster may be of a first type. Another cluster may be of a second type. The remaining two clusters may be of a third type, and so forth.

In a specific embodiment, certain clusters designated for data protection include partner clusters on different hardware islands. Continuous availability and 3-site data protection include clusters that span or stretch across hardware islands. A disaster recovery cluster type includes a partner cluster on a different hardware island. In the example shown in FIG. 4, the third cluster (disaster recovery) is in a relationship 430 or is partnered with a sixth cluster. The sixth cluster is part of a different hardware island (second hardware island) than the third cluster (first hardware island). A 3-site data protection cluster includes a cluster that stretches between hardware islands and a partner cluster. In other words, one half of the 3-site cluster spans hardware islands.

The fourth cluster (continuous availability) is included in two hardware islands because continuous availability clusters are a single stretched cluster between hardware islands and therefore have no partner. In the example shown in FIG. 4, the fourth cluster is included with the first and third hardware islands.

The fifth and eighth clusters form part of a 3-site data protection scheme or architecture in which there is one cluster stretched between two hardware islands and then a second cluster in another hardware island. In the example shown in FIG. 4, the fifth cluster is included with the first and fifth hardware islands as the fifth cluster is stretched between the first and fifth hardware islands. The eighth cluster is in the fourth hardware island and is the partner of the fifth cluster. In other words, the fifth cluster (3-site data protection) is in a relationship 440 or is partnered with the eighth cluster.

Figure 5A:
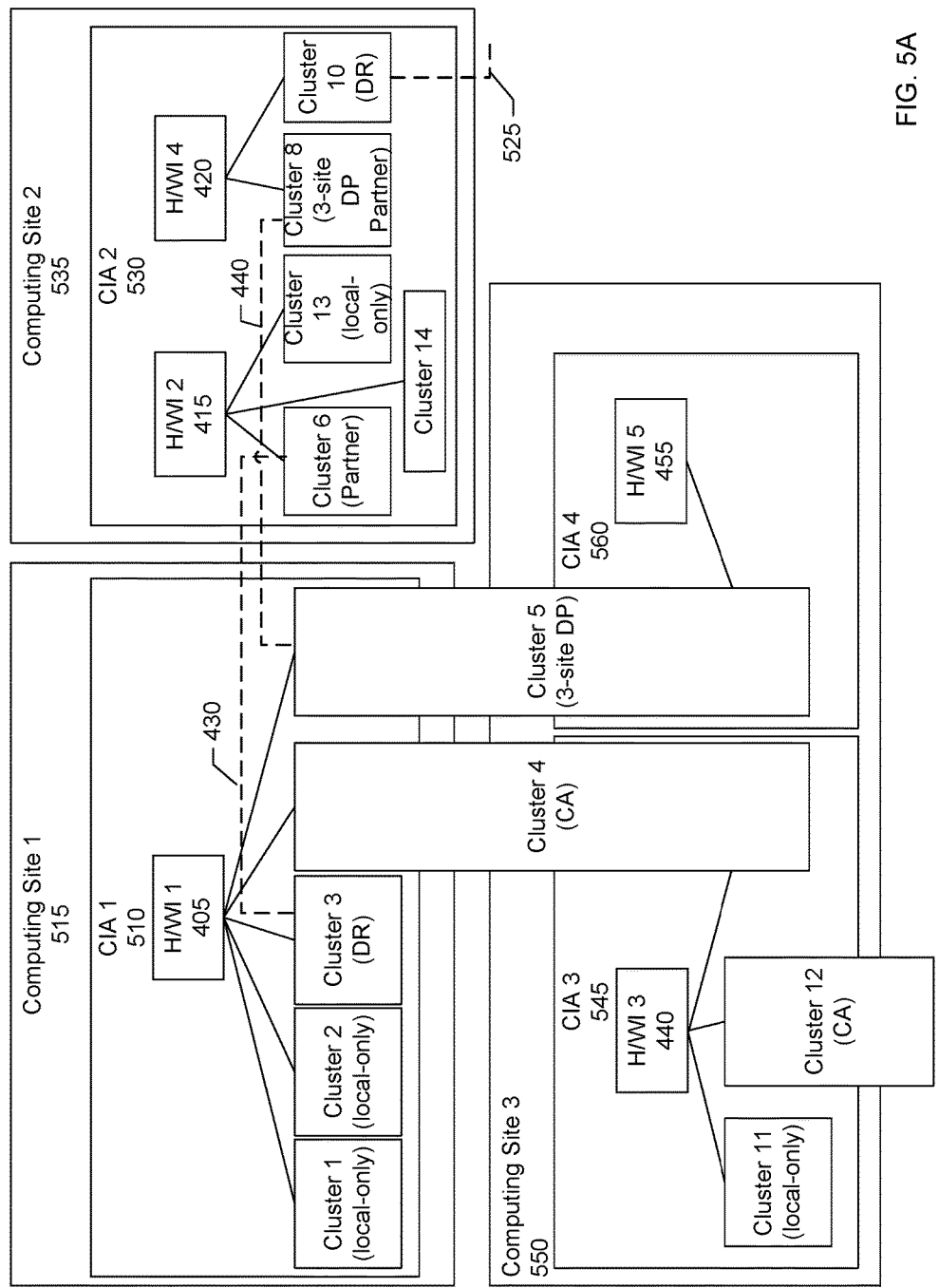
FIG. 5A is a block diagram showing an example configuration of the compute clusters according to a specific embodiment.

FIG. 5A is a block diagram showing an example of different hardware island configurations involving the compute clusters and relationships shown in FIG. 4. In the example shown in FIG. 5A, the first hardware island is within a first converged infrastructure appliance 510 located at a first site 515. The first hardware island includes the first, second, third, fourth, and fifth clusters.

The sixth cluster is registered with second hardware island 415. The eighth cluster is registered with fourth hardware island 420. A tenth cluster is shown as also being registered with the fourth hardware island. The tenth cluster is of cluster type disaster recovery. As such, the tenth cluster can be in a relationship 525 or partnered with another cluster on a different hardware island (not shown). The second and fourth hardware islands are within a second converged infrastructure appliance 530 at a second site 535, separate from the first site.

The fourth cluster is also registered with third hardware island 440. An eleventh cluster and twelfth cluster are also shown as being registered with the third hardware island. A thirteenth cluster and fourteenth cluster are also shown as being registered with the second hardware island. The eleventh and thirteenth clusters are of type local-only. The twelfth cluster is of type continuous availability. The fourteenth cluster is unused and thus available. The third hardware island is within a third converged infrastructure appliance 545 located at a third site 550.

The fifth cluster is registered with fifth hardware island 455. The fifth hardware island is within a fourth converged infrastructure appliance 560 located at the third site.

As discussed, in a specific embodiment, a compute cluster designated as being of cluster type disaster recovery is paired with a partner compute cluster. The partner serves as a fail-over target. If the primary compute cluster becomes unavailable to process a workload, the workload can be failed over to the partner compute cluster in the pair. In a disaster recovery relationship, a workload running at the primary cluster may be shutdown, moved to the partner cluster, and restarted.

In a specific embodiment, the fail-over is an automated process that is performed in response to a user manually triggering the moving or failover of the workload from the primary to the fail-over partner. When the primary becomes available the workload may be failed back from the partner.

In a specific embodiment, storage on the partner may be replicated asynchronously. In asynchronous replication a data transaction or operation such as a write operation is confirmed as complete before the storage on the partner has been updated. For example, a cluster pair may include a first cluster in a first hardware island and a second cluster in a second hardware island. The first hardware island may be located at a first site. The second hardware island may be located at a second site. The second site may be remote from the first site. For example, the second site may be in Nevada and the first site may be in New York.

The first cluster will be mapped to the second cluster in a disaster recovery relationship. The first cluster may be the primary cluster. The second cluster may be the partner target failover cluster and will remain in a passive mode when it is the target. In this specific embodiment, a write operation is confirmed as complete once the operation has been executed on storage available to the first cluster. A corresponding write operation for storage available to the second cluster may be placed on a queue and executed after the write operation has been confirmed at the first cluster.

The advantage of asynchronous replication is that the first cluster does not wait for the corresponding write operation to be completed at the second cluster. The first cluster can continue with the processing of a workload before the corresponding write operation has completed. Thus, there is very little impact to the response time of the primary. Further, the second site can be geographically located very far from the first site as the latency due to the geographical distance between the two sites will have little or no impact on the processing of the workload at the first site because the processing does not depend upon the completion of the corresponding write operation. Locating the second site far from the first site provides additional security and peace-of-mind. For example, if a catastrophe such as a fire, flood, or earthquake occurs at the first site, the catastrophe is unlikely to affect the remote second site.

In the example shown in FIG. 5A, the third cluster (disaster recovery) is partnered with the sixth cluster. The relationship thus indicates that storage is to be replicated at the sixth cluster. If, for example, there is a disruptive event at the first site where the first cluster is located, a workload being processed by the first cluster can be moved to the sixth cluster at the second site.

Continuous availability is another type of data protection service that may be offered. A continuous availability relationship includes a cluster that stretches between two hardware islands. The stretch cluster is a logical abstraction that includes compute nodes and synchronous replicated storage in two separate hardware islands. Continuous availability includes transactions or operations that are replicated synchronously. A CA relationship can be used to prevent the interruption of mission-critical business functions. In a specific embodiment, an operation, such as a write operation, is not confirmed as complete until the operation has been completed by both sets of the compute nodes in the stretch cluster where each set of compute nodes are within different hardware islands. For example, once an application makes a write to storage of a first set of compute nodes in a stretch cluster, the write is not confirmed as complete to the application until the data protection service receives an acknowledgment from a second set of compute nodes in the stretch cluster that the write has been replicated to storage associated with the second set of compute nodes.

In the example shown in FIG. 5A, the fourth cluster (continuous availability) is stretched between the first and third hardware islands. The first hardware island is within the first converged infrastructure at the first site. The third hardware island is within the third converged infrastructure at the third site. The fourth cluster includes first compute nodes that access first storage in the first converged infrastructure appliance, and second compute nodes that access second storage in the second converged infrastructure appliance.

When a write is performed to one of the first or second storage, the write is not confirmed as complete until the write is performed at another of the first or second storage. Thus, there will be multiple copies of data. There will be a copy of data at the first storage, and a copy of data at the second storage. One of the first or second storage may be referred to as a source. Another of the first or second storage may be referred to as a target.

The continuous availability architecture design tolerates the loss of an infrastructure service, application or database server, storage array, or even the complete loss of a site. Generally, it is desirable that both sites be far enough apart to not both be impacted by a single disaster, but close enough to allow for synchronous data mirroring across sites. Depending on regional location, the distance between the two sites may range from about 25 to about 60 miles apart (i.e., about 40 kilometers to about 96 kilometers).

That is, in order to provide acceptable response times and account for network latency, it is desirable to have two sites involved in a CA relationship to be geographically located relatively close to each other. For example, long-distance separations between the sites can suffer from latency because of the time required to transfer data and return acknowledgement. Thus, in cases where the continuous availability service is selected, it is desirable that the sites be relatively close to each other such as in the same city or adjacent cities to limit the distance that the cluster must stretch.

Sites involved in a DR relationship (e.g., the third and sixth clusters) may be further apart than sites involved in a CA relationship. For example, a geographical distance between the first and third sites (in which the fourth cluster is stretched between the first and third hardware islands for a CA relationship) may be less than a geographical distance between the first and second sites (in which the third and sixth clusters are in a DR relationship).

Another type of data protection service that may be offered includes 3-site data protection. This type of protection is a combination of disaster recovery and continuous availability. In a specific embodiment, a 3-site data protection relationship includes two clusters. One cluster stretches between two hardware islands. The other cluster is a disaster recovery partner to the stretch cluster and is in a different hardware island on a different site. The architecture allows for high availability and disaster recovery in a single deployment.

In the example shown in FIG. 5A, the fifth cluster (3-site data protection) is stretched between the first and fifth hardware islands. The first hardware island is at the first site. The fifth hardware island is at the fourth site. The eighth cluster is a disaster recovery partner to the fifth cluster. Data in the fifth cluster is replicated synchronously. Data in the eighth cluster is replicated asynchronously. Thus, a 3-site data protection relationship allows for three copies of data distributed among the three sites (e.g., first, second, and third sites). The copies at the first and third sites may be referred to as production copies. The copy at the second site may be referred to as a replica copy.

In order to provide acceptable response times, the first and third sites (in which the fifth cluster is stretched between the first and fifth hardware islands to provide continuous availability) are to be located relatively close to each other (e.g., about 40 kilometers to about 96 kilometers). The second site (in which the eighth cluster is assigned to provide disaster recovery to the fifth cluster) may be located relatively far from the other two sites (e.g., first and third sites) providing continuous availability. In other words, a distance between the first and second sites may be greater than a distance between the first and third sites. A distance between the second and third sites may be greater than a distance between the first and third sites.

It should be appreciated that the configuration shown in FIG. 5A is merely for example and the object model supports many other different configurations. The flexibility allows users to choose or optimize the configuration that is most appropriate for their needs, budgets, performance requirements, level of service expectations, and so forth. For example, in FIG. 5A, the fourth and fifth hardware islands 4 and 5 are shown as being on different sites. In particular, the fourth hardware island is on the second site and the fifth hardware island is on the third site. Additional sites, however, are additional expense items. In some cases, a user may decide that their needs do not require the level of redundancy offered by maintaining another site. Thus, in another specific embodiment, the fourth and fifth hardware islands can be on the same site.

As another example, the fourth cluster (continuous availability) is shown in FIG. 5A as being stretched across the first and third hardware islands which happen to be in different sites. In particular, the first hardware island is on the first site and the third hardware island is on the third site. Alternatively, in another specific embodiment, the first and third hardware islands may be on the same site. In this specific embodiment, the first and third hardware islands may be in different converged infrastructure appliances. Thus, there remains at least some level of continuous availability protection since a workload can continue uninterrupted even when one of the converged infrastructure appliances experiences a disruptive event.

As another example, the fifth cluster (3-site data protection) is shown in FIG. 5A as being stretched across the first and fifth hardware islands which happen to be in different sites. In particular, the first hardware island is on the first site and the fifth hardware island is on the third site. Alternatively, in another specific embodiment, the first and fifth hardware islands may be on the same site.

Figure 6:
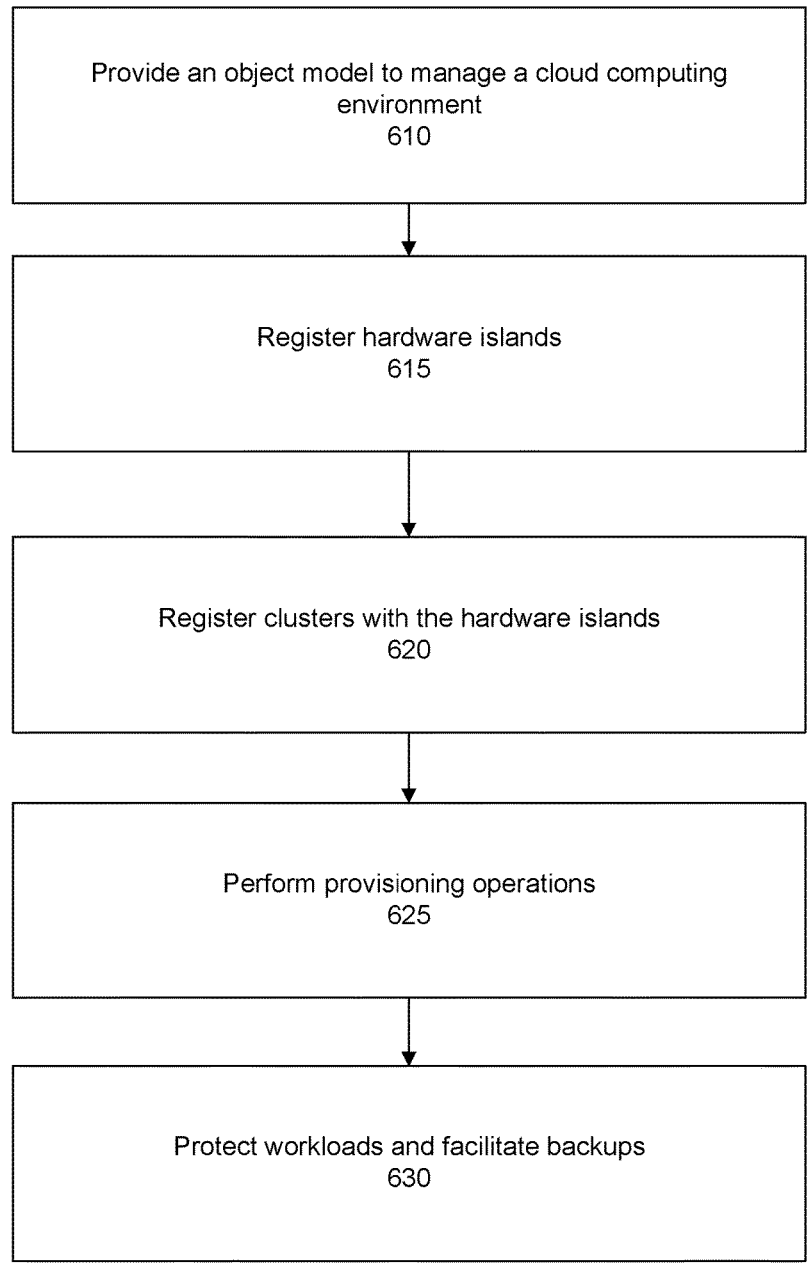
FIG. 6 shows an overall flow of the system including a registration process according to a specific embodiment.

FIG. 6 shows an overall flow 605 of the system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, an object model is provided to manage a cloud computing environment. In a step 615, hardware islands are registered or on-boarded according to the model. In a step 620, one or more clusters are registered or on-boarded with a hardware island. Registering a cluster will include designating a cluster to be of a specific type (e.g., local-only, disaster recovery, continuous availability, or 3-site data protection). The type of cluster that the user wishes to register drives other actions to help guide the user in properly configuring the environment. For example, if the user indicates they would like to register a disaster recovery cluster, the system guides them in selecting a partner cluster. During the provisioning of storage to the clusters, the system restricts the storage type that is available to be provisioned to disaster recovery storage. The guiding of the user based on previous choices that the user made helps to reduce configuration errors.

In a specific embodiment, a flow for registering a cluster includes a first step including defining a cluster type for a cluster, a second step including collecting information about the cluster, and a third step including performing and storing mapping information based on the cluster type and collected information.

Collecting information about a cluster can include receiving a location of the cluster (e.g., site that the cluster is on or a hardware island that the cluster is on), receiving an identification of backup infrastructure at the site to assign to the cluster, and so forth. A site at which the cluster is located may include multiple sets or pieces of backup infrastructure. For example, the site may include ten backup servers. The system allows the user to assign to the cluster all ten backup servers or a subset of the backup servers. The remaining backup servers in the subset may be assigned to other clusters at the site. Thus, the model provides a great deal of flexibility in the assignment of resources. Clusters that are to process workloads essential to the organization may be assigned more backup servers than clusters that are to process workloads less essential to the organization. Information received from the user about the cluster is mapped and stored. For example, information can be stored mapping the cluster to the backup infrastructure, mapping the cluster to a partner cluster, and so forth.

In a specific embodiment, a registration tool or wizard is provided. The tool may be accessible via a browser and may present the user with a graphical user interface. The tool may prompt the user to input information such as a name to be associated with a hardware island, an identification of a site to which the hardware island will be associated with, an identification of one or more clusters to register in the hardware island, a cluster type to be associated with a cluster, backup infrastructure to be associated with the cluster, and so forth. The information is received and stored. In another specific embodiment, the registration or a portion of the registration process may be performed programmatically such as through an application programming interface (API).

In a step 625, provisioning and configuration operations are performed. There can be a set of rules that govern or enforce the selection of partner clusters. For example, referring back now to FIG. 5A, to establish a data protection relationship involving two separate sites and hardware islands, the user may select the first hardware island at the first site and the second hardware island at the second site. The system can review the available clusters in the second hardware island, filter out clusters that are not available, and instead display on an electronic screen clusters of types that are available.

For example, consider that the user would like to make the third cluster in the first hardware island at the first site a disaster recovery cluster. There is a rule stored in the system specifying that DR clusters require a partner. Based on the evaluation of the rule, the system prompts the user to select a partner cluster. The system can review the clusters at another site to determine which clusters are available for potential partnering. Clusters that are not available, such as clusters that have already been used, clusters that are in other relationships, and so forth may not be displayed. Alternatively, the clusters may be displayed with a visual indicator to indicate that they are not available. For example, the unavailable clusters may be displayed as grayed out.

Figure 5B:
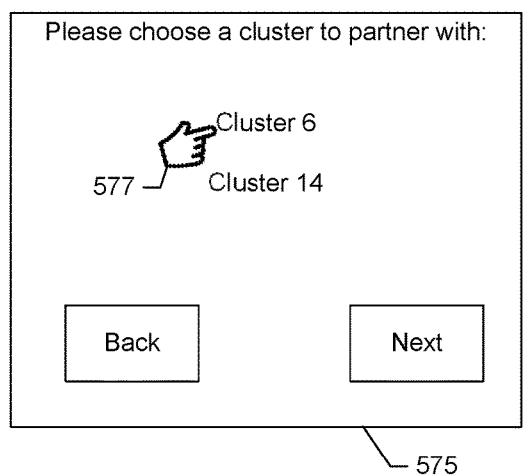
FIG. 5B shows an example of a dialog box for selecting a partner cluster to pair according to a specific embodiment.

FIG. 5B shows an example of a dialog box 575 that may be displayed on an electronic screen prompting the user to select a cluster to partner with based on the user's selection to make the third compute cluster a DR cluster. Since the user has indicated they would like there to be a DR relationship, the system displays a listing that includes clusters at the second hardware island that are available for partnering.

As shown in the example of FIG. 5B, the thirteenth cluster is not displayed in the list because it is already being used as a local-only cluster. The fourteenth cluster, however, is included in the listing of potential partners because it is unused and available (e.g., not in other relationships). The user can select from the displayed cluster choices which cluster to pair with the third cluster to form the disaster recovery relationship. In this example (and as shown in FIG. 5A) the user has selected 577 the sixth cluster to pair with the third cluster. The system, upon receiving the selection of the sixth cluster, then maps or pairs the third and sixth clusters in a DR relationship and stores the mapping information.

In various other specific embodiments, rule evaluation may include determining a geographical location of a compute cluster. For example, the system may receive an indication that the user wishes to have a cluster protected by continuous availability. There may be a rule specifying a maximum distance of 96 kilometers between two clusters in a continuous availability relationship. The system can identify a site that the cluster is located at and show a list of possible partner clusters located at different sites where a distance between the site and the other different sites is less than 96 kilometers. Rule criteria can be user-configurable.

In a step 630, workloads are protected according to the desired data protection services and backups are performed according to the desired backup policy.

Figure 7:
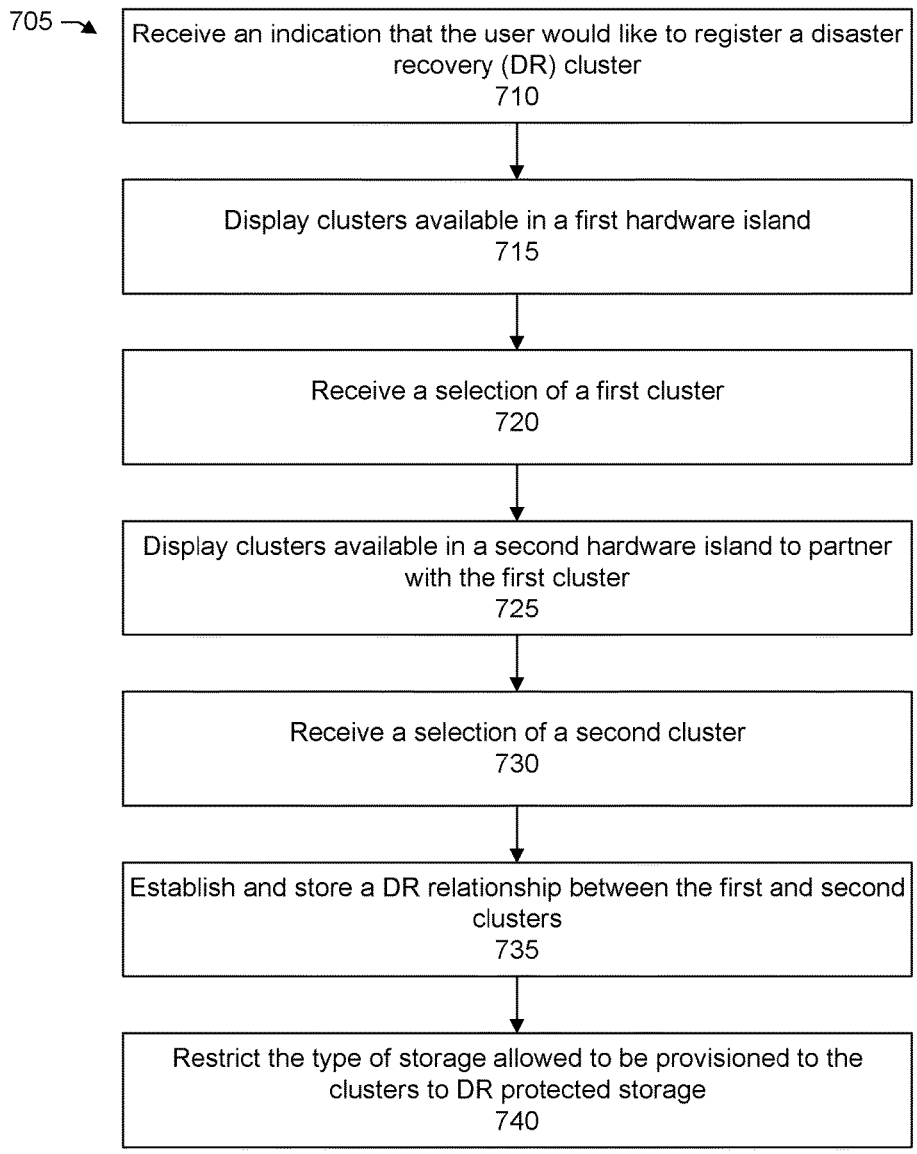
FIG. 7 shows a flow of a process for selecting a partner cluster according to a specific embodiment.

FIG. 7 shows a flow 705 for registering relationships. In this example, the relationship is a disaster recovery relationship. In a step 710, the registration tool receives an indication that the user would like to register a disaster recovery (DR) cluster. In a step 715, a listing of clusters available in a first hardware island is displayed on an electronic screen. In a step 720, a selection by a user of a first cluster is received. In a step 725, a listing of clusters available in a second hardware island is displayed on the electronic screen. In a step 730, a selection by a user of a second cluster is received. In a step 735, a disaster recovery relationship including or between the first and second clusters is established and stored. In a step 740, the type of storage allowed to be provisioned to the clusters is restricted to disaster recovery protected storage. The model, and more particularly, the information indicating that the first and second clusters are in a disaster recovery relationship can be exposed to a disaster recovery or data protection application.

As another example, a flow for creating a continuous availability relationship may include receiving an indication that the user would like to register a continuous availability cluster, receiving an indication to include a first set of compute nodes in a first hardware island in a stretch cluster, receiving an indication to include a second set of compute nodes in a second hardware island in the stretch cluster, and storing information indicating that the first and second set of compute nodes in the first and second hardware island, respectively, are in the stretch cluster. The first and second hardware islands may be located at the same or different site.

In a specific embodiment, a method includes receiving an identification of a first set of hosts at a first site to include in a stretch cluster, receiving an identification of a second set of hosts at a second site to include in the stretch cluster, configuring the stretch cluster and registering in the model the hosts as being in the stretch cluster. The model facilitates the management of affinity or affinity groups. More particularly, in a specific embodiment, when a workload is provisioned, the user can choose whether the workload should, by default, be on the first site or on the second site as the stretch cluster spans the first and second sites. Because there can be a partition between the two sites such that they cannot communicate with each other, there are rules to help manage or prevent a workload running on compute resources on one site while the storage is being restricted to the other site. For example, if the user identifies the first site as the default location for the workload, the rules can help to ensure that storage also defaults to the first site. The object model and metadata maintained by the object model about the environment allows decisions to be made regarding, for example, which compute node to put a workload on. The object model and metadata help to avoid situations where a workload is unable to run because of a partition (e.g., workload provisioned to a compute node that does not have access to the storage).

As another example, a flow for creating a 3-site data protection relationship may include receiving an indication that the user would like to register a 3-site data protection relationship, receiving an indication to include a first set of compute nodes in a first hardware island in a stretch cluster, receiving an indication to include a second set of compute nodes in a second hardware island in the stretch cluster, prompting the user to select an available cluster in a third hardware island to be a partner with the stretch cluster, receiving a selection of the cluster, and storing information indicating that the selected cluster is a partner cluster in a disaster recovery relationship with the stretch cluster, the partner cluster and stretch cluster thereby being in a 3-site data protection relationship. The first hardware island may be on a first site. The second hardware island may be on a second site, different from the first site. The third hardware island may be on a third site, different from the first and second sites. A distance between the first and second sites may be less than a distance between the first and third sites, and a distance between the second and third sites. A distance between the first and third sites, and a distance between the second and third sites, may be greater than a distance between the first and second sites.

The model further facilitates the provisioning of storage. In a specific embodiment, the system receives from a user a selection of a cluster that the user would like to provision with storage. The model is consulted to determine a cluster type of the cluster. For example, the cluster may have a disaster recovery relationship, or continuous availability relationship, and so forth. The system can filter the storage types that are available to the cluster based on the cluster's type in the model.

For example, for a cluster that is of type local-storage, the system allows local storage to be provisioned to the cluster and does not allow replicated storage to be provisioned to the cluster. For a cluster that is of type disaster recovery, the system allows protected storage (and in particular DR storage) to be provisioned to the cluster and does not allow local storage to be provisioned to the DR cluster. Replicated storage can include the appropriate logic, configuration, and so forth to permit replication including asynchronous replication for disaster recovery or synchronous replication for continuous availability.

The model is also consulted to determine what storage can be accessed by the cluster. For example, a cluster on site A in hardware island B, can access a physical array on site A in hardware island B. The cluster is not able to access a physical array on, for example, a different site in a different hardware island. In other words, the model allows a determination of the correct array that should be provisioned, and the type of storage that should be provisioned to that cluster.

Figure 8:
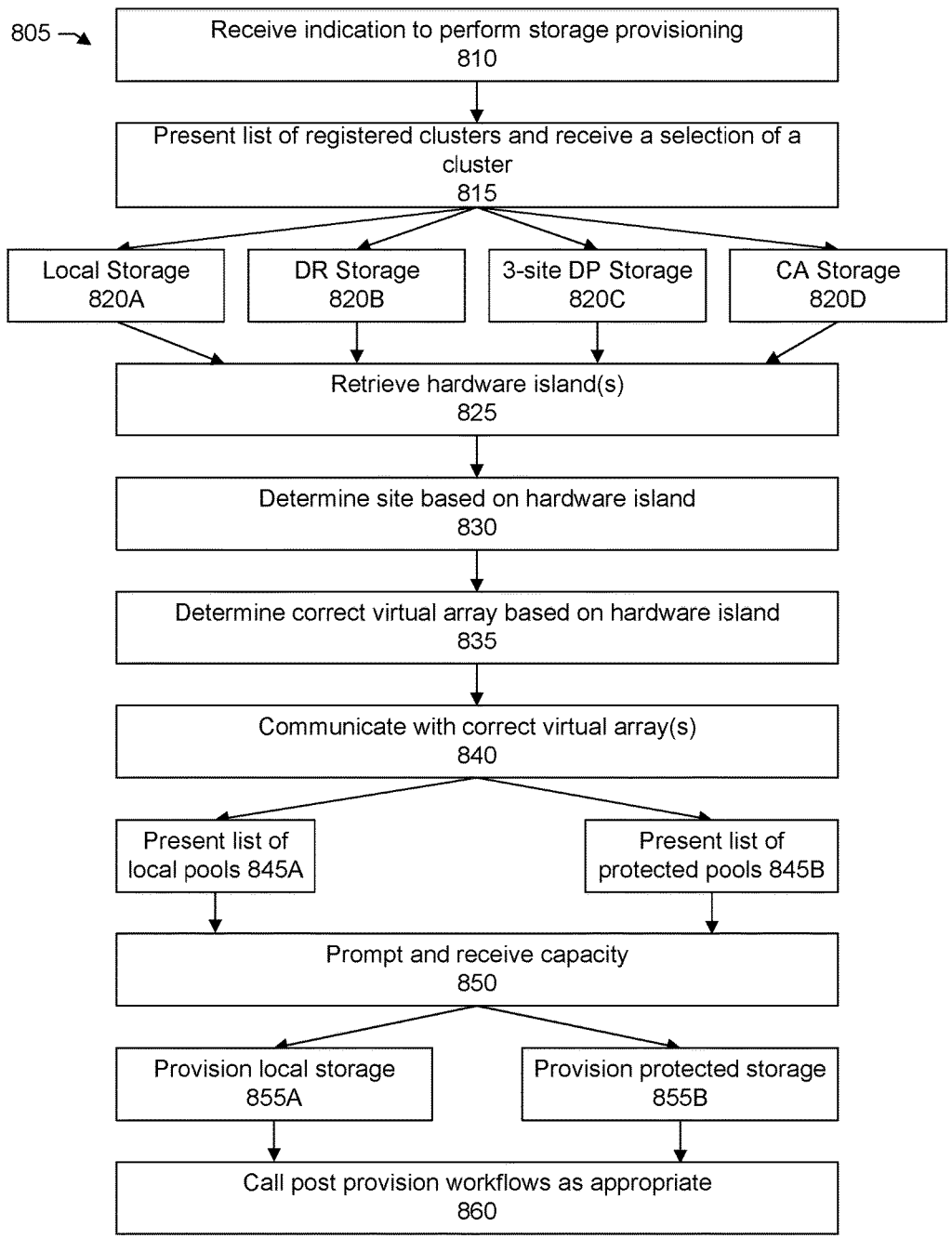
FIG. 8 shows a flow of a process for provisioning storage according to a specific embodiment.

FIG. 8 shows further detail of a flow 805 for provisioning storage according to a specific embodiment. In a step 810, the system receives an indication that the user would like to provision storage. For example, the user may select from the self-service portal a storage-as-a-service option to provision new storage. The system can prompt the user to select a site to provision storage to.

In a step 815, a list of registered clusters is presented (e.g., displayed on an electronic screen) and a selection of a cluster is received. The list of clusters may be filtered to show clusters at the selected site and exclude clusters from other sites.

The received selection of a particular cluster drives or determines whether local storage or a particular type of protected storage is available to the user. As discussed, there are cluster definitions in the object model. For example, there are clusters to support DR workloads, clusters to support CA workloads, clusters to support local workloads, and so forth. The user can choose a cluster and the system can determine what type of workloads are intended to be used on that cluster. Based on the type of cluster that is selected, the appropriate type of storage is provisioned. In other words, the type of storage provisioned is governed by the cluster chosen by the user.

For example, if the cluster type is local, local storage is provisioned (820A). If the cluster type is a protected cluster type, the corresponding protected storage type is provisioned. More particularly, if the cluster type is disaster recovery, disaster recovery storage is provisioned (820B). If the cluster type is 3-site data protection storage, 3-site data protection storage is provisioned (820C). If the cluster type is continuous availability, continuous availability storage is provisioned (820D). The filtering of storage based on cluster type helps to ensure that the correct storage (e.g., local storage or replicated storage) is provisioned to the cluster. For example, it would not be desirable to provision local storage to a continuous availability cluster because local storage is not replicated.

In a step 825, one or more hardware islands are retrieved based on the cluster chosen. The model is consulted to identify the appropriate hardware island in which the cluster is located.

In a step 830, the system determines a site based on the selected hardware island. In a specific embodiment, the system determines from the hardware island which virtual center is accessed. In a specific embodiment, the virtual center is a vCenter provided by a VMware. In this specific embodiment, the hardware island determines the vCenter. A Vcenter partner determines a remote vCenter, and the remote vCenter determines applicable destination hardware islands and clusters. Although specific embodiments of the system are discussed in conjunction with the vCenter product, it should be appreciated that aspects of the system are applicable to other infrastructure virtualization products.

In a step 835, a correct virtual array is determined based on the hardware island, i.e., which virtual array can be accessed. In a step 840, the system communicates with the correct virtual array to present a list of storage pools or kinds of storage pools that are available.

Based on the cluster type selected, the system may display a list of local pools (845A) or a list of protected pools (845B). There can be any number of different kinds of storage pools. For example, there may be "tier 1 high performance storage" that includes flash-based storage, "tier 2 performance storage" that includes mostly NL-SAS drives and some flash, "tier 3 capacity storage" that includes all NL-SAS, special types of storage that can be configured for replication, and so forth.

Consider, as an example, that the user has selected a local cluster type to provision with storage. Depending upon the user's needs, the user may choose to provision the local cluster with "tier 1 high performance storage," "tier 2 performance storage," or "tier 3 performance storage," and so forth. Consider, as another example that the user has selected a disaster recovery type cluster to provision with storage. Depending upon the user's needs, the user may choose to provision the disaster recovery cluster with "tier 1 replicated storage" (e.g., 100 percent flash-based storage) or "tier 2 replicated storage" (e.g., 40 percent flash-based storage and 60 percent NL-SAS-based storage), and so forth.

In a step 850, the system prompts the user to provide the amount of storage capacity to provision and receives the amount. The system provisions the appropriate type and amount of storage such as local storage (855A) or protected storage (855B). In an embodiment, protected storage includes replicated storage such as DR protected storage, CA protected storage, or 3-site data protection storage.

Provisioning local storage can include creating a logical unit number (LUN) and exposing the LUN to the corresponding compute cluster. A LUN represents a logical abstraction or virtualization layer between the physical disk device (e.g., physical storage array) and the compute cluster or applications. A LUN can refer to an entire physical disk, array, or subset of disk or array.

Provisioning DR protected storage can include creating a first LUN for a DR compute cluster at a first site, creating a second LUN for a partner DR compute cluster at a second site, associating the first and second LUNs, and exposing the association to a disaster recovery application to ensure that a write to the first LUN is replicated to the second LUN. The first LUN may be referred to as a source LUN. The second LUN may be referred to as a target or destination LUN. The association provided by the model helps to ensure that the writes are properly replicated with respect to considerations including write order, consistency, journaling, facilitating restorations from any point in time, and so forth. Thus, provisioning DR storage can include provisioning both the LUN on the source site and the target site, configuring the replication between the source LUN and target LUN, and exposing that replicated set to a disaster recovery application or service for the workload.

Provisioning CA protected storage can similarly include creating two LUNs. A first LUN accesses a first storage array at a first site. A second LUN accesses a second storage array at a second site. The LUNs can be combined as a distributed volume or distributed LUN and exposed to the compute nodes or hosts. The hosts do not have to be aware of there being two separate storage arrays that may be on different sites.

Provisioning 3-site protected storage can include creating a LUN on each of the two sites that have continuous availability protection, creating a distributed LUN that is exposed to hosts on each site, creating a third LUN at the disaster recovery site, and establishing a replication relationship between the third LUN and the first two LUNs involved in the continuous availability relationship.

In a step 860, post provisioning workflows are called as appropriate. In a specific embodiment, local or continuous availability clusters are exposed to the hosts and there no post provisioning tasks. There are, however, post provisioning tasks for disaster recovery clusters. Post provisioning tasks for disaster recovery clusters include informing the disaster recovery application about the DR protected storage. In other words, in order for the DR application to later protect a virtual machine running on the storage, the DR application needs to be informed of the protected storage.

Figure 9A:
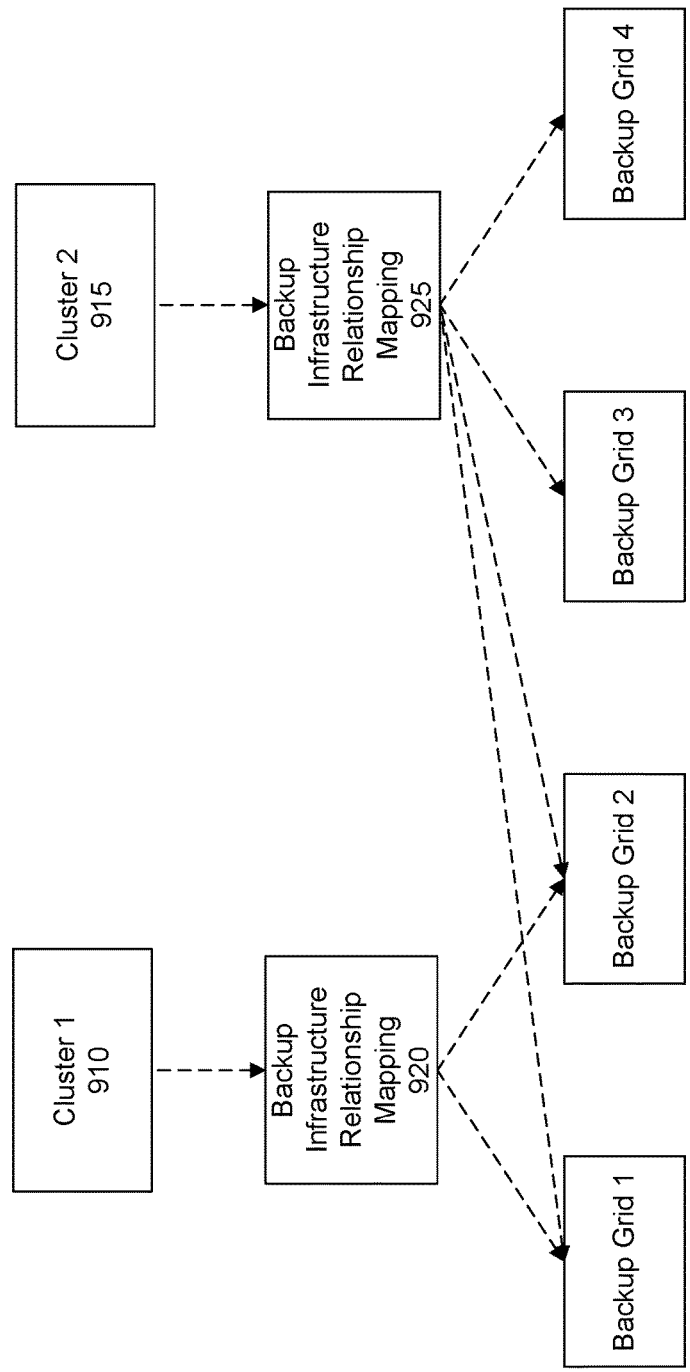
FIG. 9A is a block diagram showing mapping of a cluster to backup infrastructure according to a specific embodiment.

FIG. 9A is a block diagram showing cluster to backup infrastructure mapping. In a specific embodiment, two or more clusters within the same hardware islands may be mapped to the same or different backup infrastructure. In the example shown in FIG. 9A, there is a first cluster 910, a second cluster 915, backup grids 1-4, and backup infrastructure mapping information 920 and 925. In the example shown in FIG. 9A, the first cluster is mapped via backup mapping 920 to the first and second backup grids. The second cluster is mapped via backup mapping 925 to the first, second, third, and fourth backup grids. The backup grids (backup infrastructure) may be on the same or different sites.

There may be more than one set of backup infrastructure associated with clusters in the same hardware island. The ability to provide for multiple sets of backup infrastructure facilitates dedication and service tiers. The system allows dedicating individual items to different compute resources to provide different tiers or levels of service. For example, a first tier may be established as including dedicated backup infrastructure whereas clusters outside the first tier will share other backup infrastructure. In a specific embodiment, any given virtual machine is backed up by only one set of infrastructure based on the folder that the virtual machine is in. In a specific embodiment, a vCenter folder facilitates determining which backup infrastructure to query for backup images. In various specific embodiments, different clusters may have different mappings. Mappings can overlap. Different clusters may be mapped to more than one set of backup infrastructure.

Figure 9B:
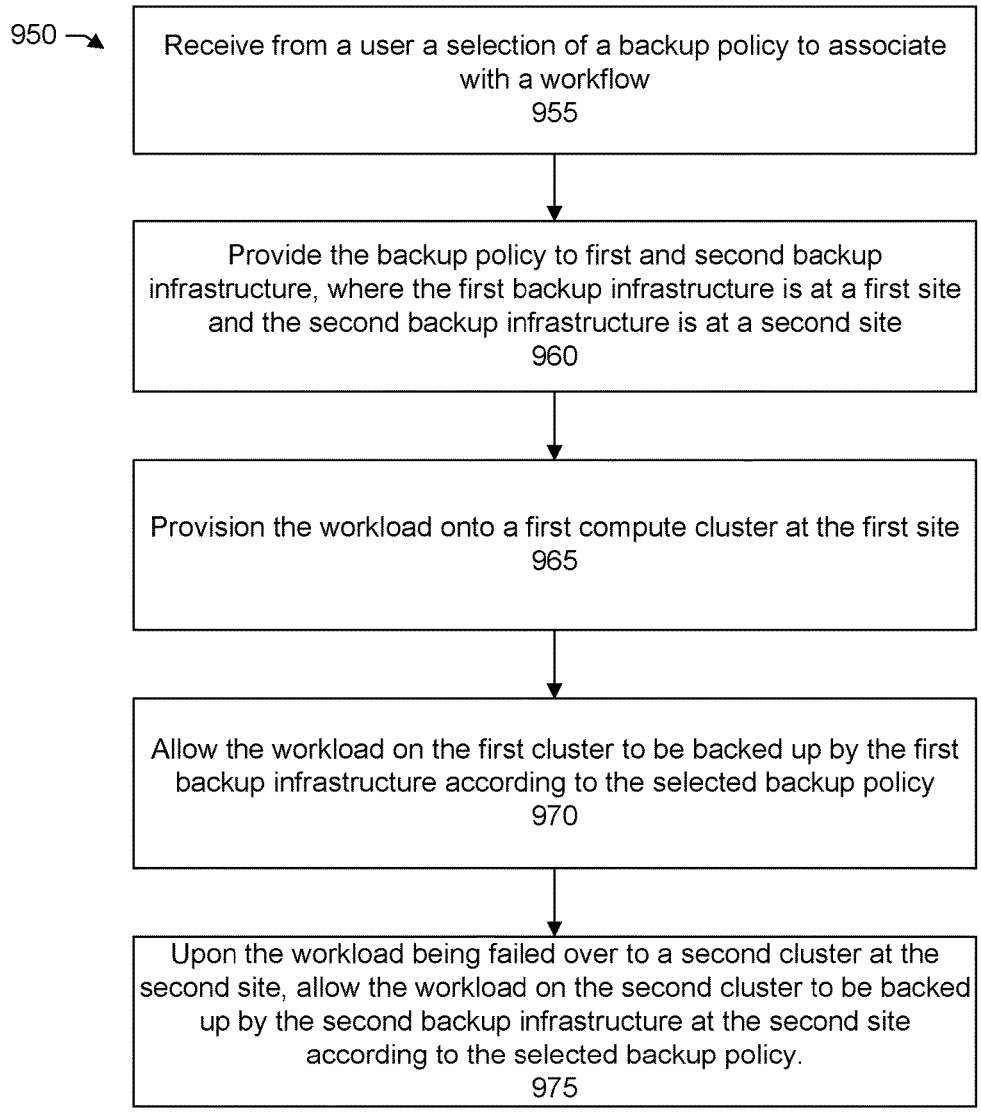
FIG. 9B shows a flow of a process for a floating backup policy according to a specific embodiment.

FIG. 9B shows a flow 950 for a "floating backup policy." The "floating backup policy" technique helps to ensure that backups of a workload are performed consistently according to a user-selected backup policy regardless of the site where the workload may have been processed. In a step 955, the system receives from a user a selection of a backup policy to be associated with a workload. In a step 960, the system provides the selected backup policy to first and second backup infrastructure, where the first backup infrastructure is at a first site and the second backup infrastructure is at a second site.

In a step 965, the workload is provisioned onto a first compute cluster at the first site. In a step 970, the workload on the first compute cluster is allowed to be backed up according to the selected backup policy by the first backup infrastructure.

In a step 975, upon the workload being failed over to the second cluster at the second site, the workload on the second compute cluster is allowed to be backed up according to the selected backup policy by the second backup infrastructure. Backups of the workload can continue according to the selected backup policy even though the workload may be undergoing processing by a different compute cluster associated with different backup infrastructure. In a specific embodiment, the backup policy is provided to the second backup infrastructure before the workload is provisioned. Thus, in the event that the workload is failed over, the selected backup policy will already be in place at the second backup infrastructure.

In a specific embodiment, the model provides a map correlating backup infrastructure to clusters. At least a subset of the clusters support a disaster recovery relationship. A user is permitted to define a set of backup policies. Each policy may specify, for example, a time that a backup is to be performed, a frequency of a backup (e.g., hourly, daily, weekly, and so forth), a retention period of a backup, and so forth. The system receives a selection of a backup policy to associate with a workload. The backup policy is distributed to backup infrastructure at each of the different sites in the cloud. A workload is provisioned onto a first cluster at a first site. First backup infrastructure at the first site backups the workload according to the selected backup policy. Upon the workload being failed over to a second cluster at a second site, second backup infrastructure at the second site backups the workload according to the same selected backup policy.

In a specific embodiment, backup infrastructure is configured to monitor a set of folders for virtual machines to be backed up. A virtual machine in a monitored folder is backed up. The set of folders are associated with different backup policies. For example, a first folder is associated with a first backup policy. A second folder is associated with a second backup policy, different from the first backup policy. For example, the first backup policy may specify daily backups at 10:00 PM and a retention period of 2 weeks. The second backup policy may specify weekly backups at 2:00 AM on Sundays and a retention period of 3 weeks. A VM located in the first folder is backed up according to the first backup policy. A VM located in the second folder is backed up according to the second backup policy, and so forth.

In this specific embodiment, there is a first site including a DR protected cluster, first backup infrastructure, and a first set of folders associated with a set of backup policies. There is a second site including a partner cluster to the DR protected cluster, second backup infrastructure, and a second set of folders associated with the set of backup policies. Provisioning a DR protected workload associated with a user-selected backup policy on the DR protected cluster includes placing a VM that runs the workload into a first folder of the first set of folders, where the first folder corresponds to the user-selected backup policy.

A place holder VM is created at the second site. The system determines the user-selected backup policy associated with the VM on the other site (e.g., determines the backup policy folder that the VM is in). Based on the determination, the place holder VM is moved into a second folder of the second set of folders, where the second folder corresponds to the user-selected backup policy. The place holder VM may be maintained in a stand-by or inactive mode. Storage between the clusters is replicated based on the DR relationship.

Failing over the workload includes activating, by the disaster recovery application, the place holder VM in the second folder. Upon the place holder VM becoming active, the second backup infrastructure begins backing up the now active VM according to the user-selected backup policy by virtue of the place holder VM having been placed in the second folder corresponding to the user-selected backup policy.

Establishing the first and second set of corresponding folders as an initial configuration step helps to provide redundancy. Thus, even if the first site should fail such as the first set of folders are no longer available, there can still be the second set of folders available at the second site. Further, there may be other workloads running at the second site that have also been associated with the same user-selected backup policy. A workload of any type can be provisioned to any site in the cloud and each site will include the same set of backup policies that can be applied to the workload. This helps to improve the user experience because a user can provision a workload to a site, select a backup policy, and be assured that the selected backup policy will be at the site.

As discussed, in a specific embodiment, the backup policy exists on both sides, from the start. It does not need to be dynamically provided to the second site. In disaster recovery relationships the policies are active/active and the second backup infrastructure picks up the work if the workload moves. In a specific embodiment, in a continuous availability relationship, an administrator initiated toggle is required to enable policy on the secondary site should workloads move. In other specific embodiments, these options for backup policy mode can be configurable.

Figure 10:
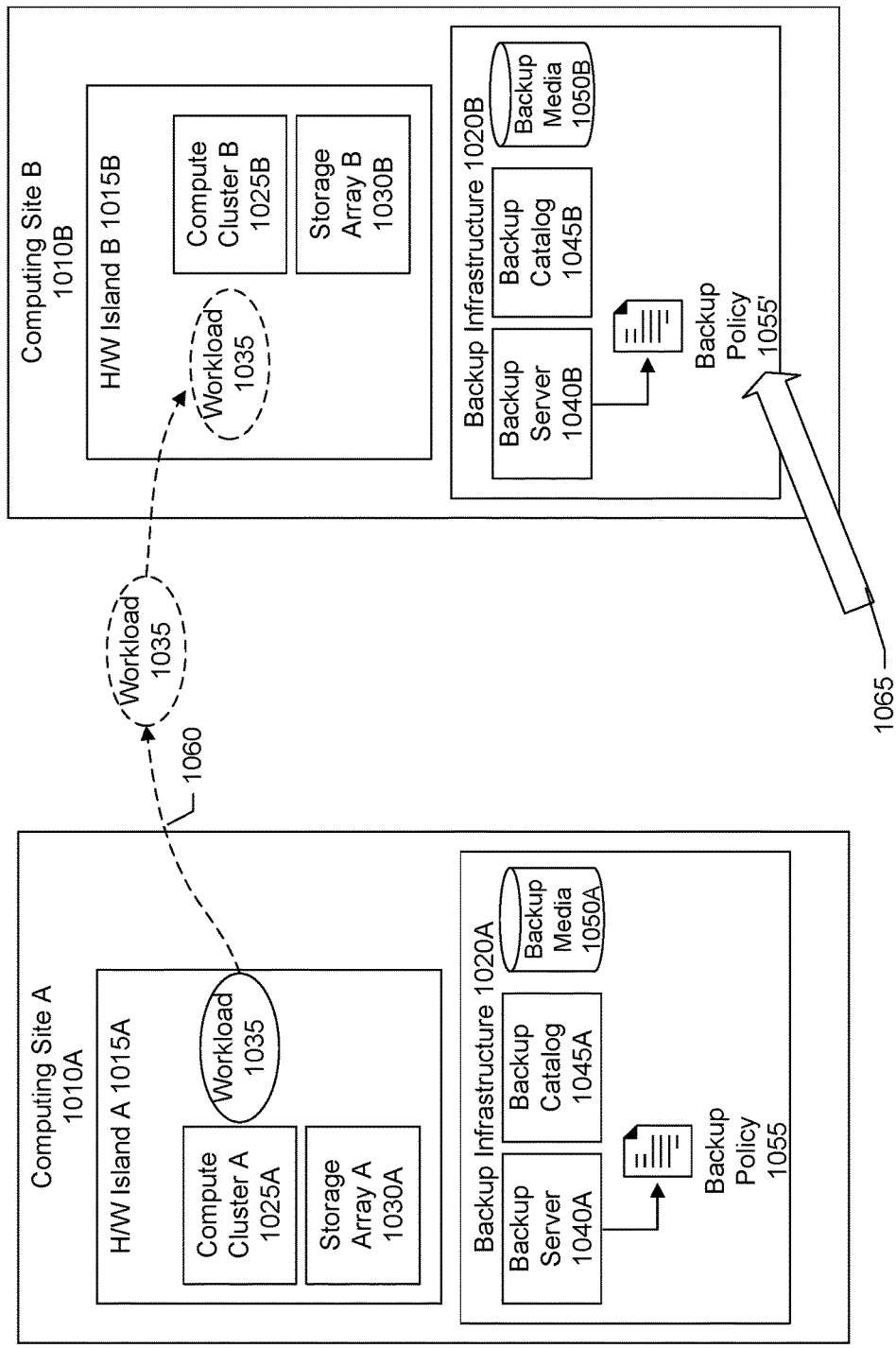
FIG. 10 shows a block diagram of a floating backup policy "following" a workload according to a specific embodiment.

FIG. 10 is a block diagram showing a workload being processed and backed up. In the example shown in FIG. 10, there is a first site 1010A. The first site includes a first hardware island 1015A and first backup infrastructure 1020A.

The first hardware island includes a first compute cluster 1025A and a first storage array 1030A providing storage to the first compute cluster. There is a workload 1035 being processed by the first compute cluster.

There is a second site 1010B. The second site includes a second hardware island 1015B and second backup infrastructure 1020B, separate or different from the first backup infrastructure. The second hardware island includes a second compute cluster 1025B and a second storage array 1030B providing storage to the second compute cluster. The second cluster may be associated with a second backup infrastructure (e.g., a second backup server) at the second site that is responsible for backing up workloads on the second cluster. The second backup infrastructure includes a second backup server 1040B, a second backup catalog 1045B, and a second backup media 1050B.

The compute clusters are mapped to backup site relationships which indirectly maps them to one or more sets of backup infrastructure (see, e.g., FIG. 9A). Having backup infrastructure at each site allows for fast and efficient backups as a piece of backup infrastructure will be located locally with respect to the compute cluster it is associated with.

The first backup infrastructure includes a first backup server 1040A, a first backup catalog 1045A, and a first backup media 1050A. Backups associated with the workload being processed by the first cluster are stored in the first backup media. An index of the backups is maintained in the first backup catalog. The first backup server accesses a backup policy 1055 that specifies backup options for backing up the workload.

For example, as discussed above, the backup policy may specify a backup schedule or a time that backups should be performed (e.g., daily at 10:00 PM), a retention period or a length of time that a backup should be stored (e.g., two weeks), and so forth.

In a specific embodiment, the "moving" of the workload is initiated manually. In this specific embodiment, the system receives from the user a command to move the workload from the first cluster to the second cluster. The command may be received through a graphical user interface where the user can select a graphical widget corresponding to the move command. As discussed, in a specific embodiment, a "moving" of a workload includes activating a place holder VM in a DR partner cluster.

In another specific embodiment, the moving of the workload is automatic. For example, in this specific embodiment, there can be a monitoring agent installed at the first cluster. The monitoring agent monitors a status of the cluster, workload processing, log data (e.g., error logs), storage, and the like.

For example, the monitoring agent may scan an error log stored at the first storage array to detect error messages associated with the processing of the workload that may have been logged. The cloud management server, upon receiving the alert, may consult the object model and relationships to identify a partner of the first compute cluster. A stored relationship may indicate that the first and second compute clusters are in a disaster recovery relationship. Upon identifying the partner, the cloud management server may automatically "move" the workload from the first cluster to the second cluster. The fail over of the workload may be accompanied by a command from the cloud management server to the second cluster instructing the instantiation of one or more virtual machines at the second cluster that are to process the workload.

In the example shown in FIG. 10, the workload has been moved or failed over 1060 from the first cluster to the second cluster. Since the cloud management server has already provided 1065 the backup policy associated with the workload to the second backup infrastructure (e.g., second backup server), the backup of the workload can begin immediately with respect to the backup policy.

In other words, there will be copies of backup policies at both the first and second sites. In a specific embodiment, the cloud management server copies the backup policy into a folder that the second backup server monitors for the existence of a backup policy to follow. The second backup sever accesses the folder having the copied backup policy to backup the workload now being processed at the second cluster according to the backup policy. More particularly, backups associated with the workload now being processed at the second cluster are stored in the second backup media. An index of the backups for the workload at the second cluster is maintained in the second backup catalog. The second backup server accesses a copy 1055' of the backup policy that specifies backup options for backing up the workload.

As discussed, in a specific embodiment, the backup policy or a copy of the backup policy is provided automatically to the second backup server. This allows backups to continue as originally specified by the user with little or no interruption. For example, if the backup policy specified daily backups at 10:00 PM, then the second backup server performs daily backups at 10:00 PM for the workload now being processed at the second backup server. The system can include user-configurable setting to help ensure consistency across different time zones. For example, the first site may be located in a first time zone. The second site may be located in a second time zone, different from the first time zone. In a specific embodiment, the setting may specify that backups are to be performed according to the local time zones of the respective sites. In another specific embodiment, the setting may specify that backups are to be performed according to the time zone of the original primary site.

In a specific embodiment, the backup policy is provided pre-emptively to the second backup server or before the occurrence of a disruptive event at the first site. Once the user selects a backup policy to be associated with the workload to be processed by the first compute cluster, the cloud management server can access the object model and relationship to identify the partner compute cluster (e.g., second compute cluster) of the first compute cluster. In another specific embodiment, the backup policy is provided to the second backup server after the occurrence of a disruptive event at the first site.

Figure 11:
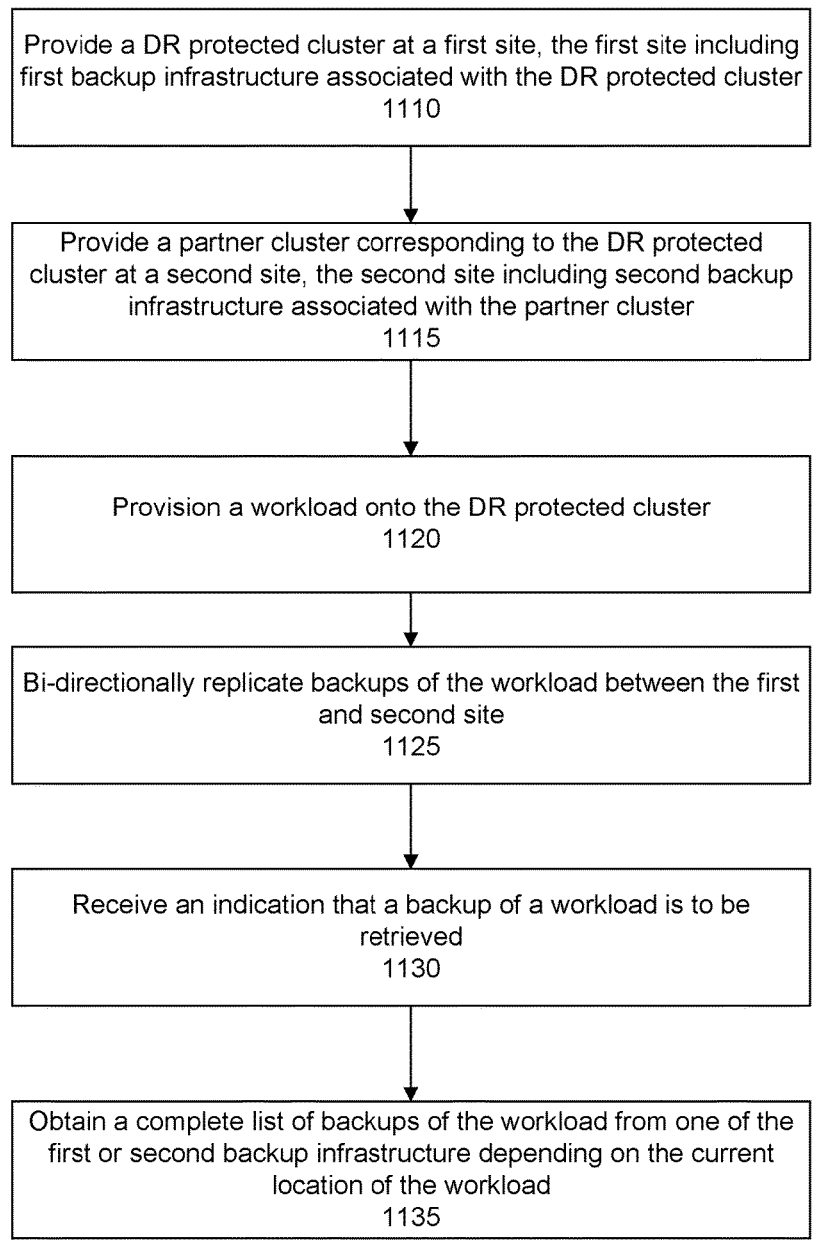
FIG. 11 shows a flow of a process for obtaining backups associated with a workload according to a specific embodiment.

FIG. 11 shows a flow 1105 of a process for obtaining backups. In a step 1110, a DR protected cluster is provided at a first site. The first site including first backup infrastructure associated with the DR protected cluster. In a step 1115, a partner cluster corresponding to the DR protected cluster is provided at a second site. The second site includes second backup infrastructure associated with the partner cluster. In a step 1120, a workload is provisioned onto the DR protected cluster.

In a step 1125, backups of the workload are bi-directionally replicated between the first and second site. In other words, backups made of the workload while the workload is being processed at the first site are replicated or sent to the second site. Backups made of the workload while the workload may have been processed at the second site (such as in a fail over situation) are replicated or sent to the first site. Thus, each of the first and second site (or first and second backup infrastructure) will have a listing of backups made locally and a listing of backups made remotely (i.e., the replicated backups).

In a step 1130, the system receives an indication that a backup of a workload is to be retrieved. In a step 1135, the system obtains a complete list of backups of the workload from one of the first or second backup infrastructure depending on the current location of the workload. If the workload is currently on the first site, the list of backups can be obtained from the first backup infrastructure. If the workload is currently on the second site, the list of backups can be obtained from the second backup infrastructure.

The system can issue a first query to the local instance to obtain a first listing of backups made locally. The system can issue a second query to the local instance to obtain a second listing of replicated backups (e.g., backups made remotely and sent to the other site). The system is able to obtain a complete list because the backups are replicated bi-directionally. Thus, even if one of the first or second sites becomes unavailable, a complete backup listing can be obtained from the other of the first or second sites even though the workload may have been processed at different times at each of the first and second sites. The backups are obtained from the local system or backup infrastructure instance, e.g., the site at which the workload (or VM processing the workload) is currently at.

The system can display or provide a listing of backups performed by different backup infrastructure for the user to select. For example, the listing of backups by the different backup infrastructure may be combined, collated, or merged into a single list and displayed on an electronic screen. A single listing of workload backups helps to facilitate a good user experience because the user can select a particular backup to restore regardless of where the workload may have been processed and regardless of what backup infrastructure may be participated in backing up the workload at different times. Table A below shows an example of listing of backups that may be displayed on an electronic screen by the system.

TABLE A

| Backup name | Time and Date |
|---|---|
| Backup 1 | Feb. 3, 2016, 10:00 PM |
| Backup 2 | Feb. 4, 2016, 10:00 PM |
| Backup 3 | Feb. 5, 2016, 10:00 PM |
| . . . | . . . |

As shown in the sample data from table A, daily backups over three days were made at 10:00 PM. In a specific embodiment, the listing can include at least one backup performed by a first backup infrastructure, and at least one backup performed by a second backup infrastructure. For example, a backup 1 at 10:00 PM on Feb. 3, 2016, may have been performed at a first site by a first backup infrastructure located at the first site while the workload was being processed at the first site. A backup 2 at 10:00 PM on Feb. 4, 2016, may have been performed at a second site by a second backup infrastructure located at the second site while the workload was being processed at the second site.

Figure 12:
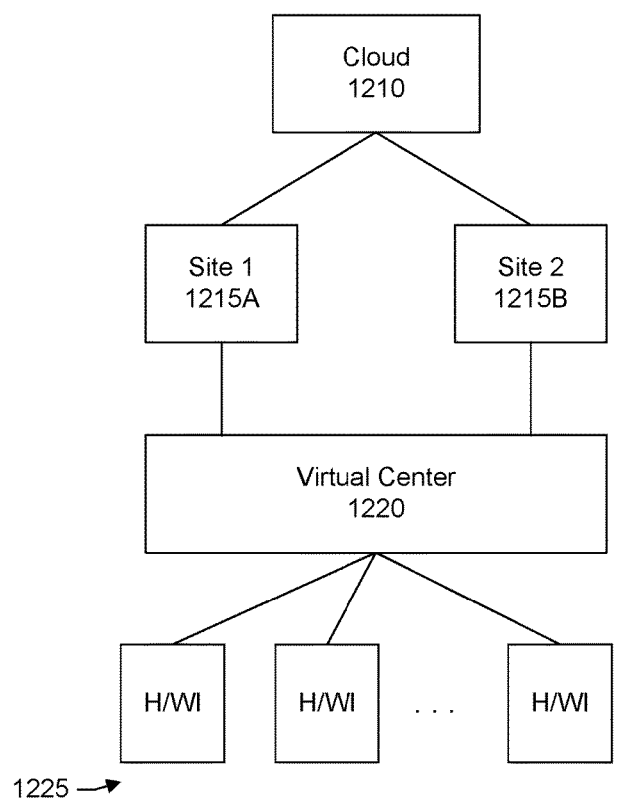
FIG. 12 shows a block diagram of a cloud architecture according to another specific embodiment.

FIG. 12 is a block diagram showing a cloud environment architecture according to another specific embodiment. In the example shown in FIG. 12, a cloud 1210 includes any number of sites such as a first site 1215A and a second site 1215B. A virtual center 1220 is positioned between the sites and a set of hardware islands 1225. In a specific embodiment, the virtual center is a vCenter. The virtual center allows for abstracting a data center by creating a virtual infrastructure that may span multiple sites. The hardware island is part of a virtual center and does not span virtual centers. That is, a hardware island registers with the virtual center and the virtual center is part of a site or registers with the site. A hardware island may be in only one virtual center, but as discussed the virtual center may be associated with more than one site. The above discussion of hardware islands, compute cluster types, data protection of workloads, and the like are applicable to the cloud environment architecture shown in FIG. 12.

In a specific embodiment, there is a method comprising: defining, by a hardware processor, a first hardware island as including at least a first compute cluster; associating a first backup infrastructure with the first compute cluster; defining a second hardware island as including at least a second compute cluster; associating a second backup infrastructure with the second compute cluster; establishing a partnership between the first and second compute clusters; receiving, from a user, a selection of a backup policy to be associated with a workload; provisioning the workload to the first compute cluster for processing; and providing the selected backup policy to the second backup infrastructure. The first backup infrastructure may be at a first site, and the second backup infrastructure is at a second site, remote from the first site. In an embodiment, the selected backup policy specifies a time and frequency for backups.

The method may include providing the selected backup policy to the first backup infrastructure; allowing the first backup infrastructure to backup the workload being processed at the first compute cluster according to the selected backup policy; and replicating backups of the workload created by the first backup infrastructure to the second backup infrastructure.

The first compute cluster may be located inside a first converged infrastructure (CI) appliance, and the second compute cluster may be located inside a second CI appliance, different from the first CI appliance.

In a specific embodiment, the partnership indicates that the workload is to be failed over from the first compute cluster to the second compute cluster when the first compute cluster experiences a disruptive event.

In another specific embodiment, the method includes obtaining a complete listing of backups from one of the first or second backup infrastructure, wherein each backup of the complete listing was made according to the selected backup policy, and the complete listing includes backups made by the first backup infrastructure while the workload was being processed by the first compute cluster, and backups made by the second backup infrastructure while the workload was being processed by the second compute cluster.

In another specific embodiment, there is a system for backing up a workload, the system comprising: a processor-based system executed on a computer system and configured to: define, by a hardware processor, a first hardware island as including at least a first compute cluster; associate a first backup infrastructure with the first compute cluster; define a second hardware island as including at least a second compute cluster; associate a second backup infrastructure with the second compute cluster; establish a partnership between the first and second compute clusters; receive, from a user, a selection of a backup policy to be associated with the workload; provision the workload to the first compute cluster for processing; and provide the selected backup policy to the second backup infrastructure.

In another specific embodiment, there is a computer program product, comprising a non-transitory computer-readable medium having a computer-readable program code embodied therein, the computer-readable program code adapted to be executed by one or more processors to implement a method comprising: defining, by a hardware processor, a first hardware island as including at least a first compute cluster; associating a first backup infrastructure with the first compute cluster; defining a second hardware island as including at least a second compute cluster; associating a second backup infrastructure with the second compute cluster; establishing a partnership between the first and second compute clusters; receiving, from a user, a selection of a backup policy to be associated with a workload; provisioning the workload to the first compute cluster for processing; and providing the selected backup policy to the second backup infrastructure.

In a specific embodiment, there is a method comprising: providing an object model, stored on a data storage device, to represent resources available in a cloud computing environment as hardware islands; registering, by a hardware processor, a first compute cluster with a first hardware island; registering a second compute cluster with a second hardware island; establishing a partnership between the first and second compute clusters; and based on the partnership, protecting a workload being processed by at least the first compute cluster.

The first compute cluster may be located inside a first converged infrastructure (CI) appliance, and the second compute cluster may be located inside a second CI appliance, separate from the first CI appliance. In an embodiment, the first hardware island is at a first site, and the second hardware island is at a second site, remote from the first site.

The method may include defining within the object model a stretch cluster between the first and second hardware island, wherein the stretch cluster comprises the first compute cluster, and the second compute cluster, and wherein data operations by the first compute cluster are executed synchronously with the second compute cluster.

The method may include defining within the object model a disaster recovery relationship between the first and second compute clusters, wherein based on the disaster recovery relationship, the workload is processed at the second compute cluster when the first compute cluster becomes unavailable.

The method may include defining a stretch cluster between the first and second hardware islands, the stretch cluster comprising the first compute cluster, and the second compute cluster; and partnering the stretch cluster with a third cluster in a third hardware island to provide disaster recovery for the stretch cluster, wherein the first hardware island is at a first cloud computing site, the second hardware island is at a second cloud computing site, the third hardware island is at a third cloud computing site, wherein a first distance is between the first and second sites, a second distance is between the first and third sites, and a third distance is between the second and third sites, and wherein the first distance is less than the second and third distances.

In another specific embodiment, there is a system for protecting a workload, the system comprising: a processor-based system executed on a computer system and configured to: provide an object model, stored on a data storage device, to represent resources available in a cloud computing environment as hardware islands; register, by a hardware processor, a first compute cluster with a first hardware island; register a second compute cluster with a second hardware island; establish a partnership between the first and second compute clusters; and based on the partnership, protect a workload being processed by at least the first compute cluster.

In another specific embodiment, there is a computer program product, comprising a non-transitory computer-readable medium having a computer-readable program code embodied therein, the computer-readable program code adapted to be executed by one or more processors to implement a method comprising: providing an object model, stored on a data storage device, to represent resources available in a cloud computing environment as hardware islands; registering, by a hardware processor, a first compute cluster with a first hardware island; registering a second compute cluster with a second hardware island; establishing a partnership between the first and second compute clusters; and based on the partnership, protecting a workload being processed by at least the first compute cluster.

In a specific embodiment, there is a method comprising: storing, on a data storage device, a cloud object model to represent resources available in a cloud computing environment as hardware islands; registering, by a hardware processor, a first compute cluster with a first hardware island; designating the first compute cluster as being of a particular cluster type; receiving, from a user, an indication to provision the first compute cluster with storage; accessing the model to determine a cluster type of the first compute cluster; and provisioning the first compute cluster with storage of a type of that corresponds to the cluster being of the particular cluster type, wherein the storage provisioned comprises one of replicated storage or non-replicated storage.

The method may include defining within the model a stretch cluster between the first hardware island, and a second hardware island, wherein the first hardware island is located at a first cloud computing site, the second hardware island is located at a second cloud computing site, separate from the first cloud computing site, and the stretch cluster comprises compute nodes at the first cloud computing site, and compute nodes at the second cloud computing site; and provisioning the stretch cluster with replicated storage to synchronously replicate write operations by the compute nodes at the first cloud computing site with the compute nodes at the second cloud computing site.

The first cluster type may indicate that the first compute cluster is in partnership with a second compute cluster in a second hardware island to support disaster recovery, and the method may include provisioning replicated storage to asynchronously replicate write operations by the first compute cluster with the second compute cluster.

The method may include prompting the user to select a level of performance for the storage to be provisioned.

In an embodiment, the replicated storage comprises one of storage in which write operations are synchronous with another storage device, or storage in which the write operations are asynchronous with the other storage device.

The first compute cluster may be located inside a converged infrastructure (CI) appliance.

In another specific embodiment, there is a system for provisioning storage, the system comprising: a processor-based system executed on a computer system and configured to: store, on a data storage device, a cloud object model to represent resources available in a cloud computing environment as hardware islands; register, by a hardware processor, a first compute cluster with a first hardware island; designate the first compute cluster as being of a particular cluster type; receive, from a user, an indication to provision the first compute cluster with storage; access the model to determine a cluster type of the first compute cluster; and provision the first compute cluster with storage of a type of that corresponds to the cluster being of the particular cluster type, wherein the storage provisioned comprises one of replicated storage or non-replicated storage.

In another specific embodiment, there is a computer program product, comprising a non-transitory computer-readable medium having a computer-readable program code embodied therein, the computer-readable program code adapted to be executed by one or more processors to implement a method comprising: storing, on a data storage device, a cloud object model to represent resources available in a cloud computing environment as hardware islands; registering, by a hardware processor, a first compute cluster with a first hardware island; designating the first compute cluster as being of a particular cluster type; receiving, from a user, an indication to provision the first compute cluster with storage; accessing the model to determine a cluster type of the first compute cluster; and provisioning the first compute cluster with storage of a type of that corresponds to the cluster being of the particular cluster type, wherein the storage provisioned comprises one of replicated storage or non-replicated storage.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above. Processes, components, method steps, modules, and techniques, as described herein may be embodied and implemented as hardware circuitry, software routines, firmware, or any combination thereof.

What is claimed is:

1. A method comprising:
   defining, by a hardware processor, a first hardware island as including at least a first compute cluster;
   associating a first backup infrastructure with the first compute cluster;
   defining a second hardware island as including at least a second compute cluster;
   associating a second backup infrastructure with the second compute cluster;
   establishing a partnership between the first and second compute clusters;

receiving, from a user, a selection of a backup policy to be associated with a workload;

copying the selected backup policy into a first folder at the first compute cluster;

copying the selected backup policy into a second folder at the second compute cluster;

creating a place holder virtual machine (VM) in the second folder;

provisioning the workload to the first compute cluster for processing by a first VM at the first compute cluster;

backing up, by the first backup infrastructure, the workload being processed at the first compute cluster according to the selected backup policy copied into the first folder at the first compute cluster to generate a first set of backups at the first backup infrastructure;

replicating the first set of backups from the first backup infrastructure to the second backup infrastructure;

maintaining the place holder VM in a standby mode and the selected backup policy in the second folder at the second compute cluster while the workload is being processed at the first compute cluster by the first VM and backed up, by the first backup infrastructure, according to the selected backup policy copied into the first folder at the first compute cluster; and upon the workload being failed over to the second compute cluster, activating the place holder VM to process the workload failed over to the second compute cluster;

initiating a corresponding backup of the workload failed over to the second compute cluster, by the second backup infrastructure, according to the selected backup policy copied into the second folder at the second compute cluster to generate a second set of backups at the second backup infrastructure, wherein the selected backup policy is copied into the second folder at the second compute cluster before the workload is provisioned and failed over to the second compute cluster; and replicating the second set of backups from the second backup infrastructure to the first backup infrastructure, wherein the first backup infrastructure thereby comprises first complete backups of the workload, the first complete backups comprising the first set of backups made while the workload was being processed at the first compute cluster, and a copy of the second set of backups made while the workload was being processed at the second compute cluster, and wherein the second backup infrastructure thereby comprises second complete backups of the workload, the second complete backups comprising the second set of backups made while the workload was being processed at the second compute cluster, and a copy of the first set of backups made while the workload was being processed at the first compute cluster.

2. The method of claim 1 wherein the first backup infrastructure is a first site, and the second backup infrastructure is at a second site, remote from the first site.

3. The method of claim 1 comprising:
obtaining, from the first backup infrastructure, the first complete backups comprising the first set of backups made while the workload was being processed at the first compute cluster, and the copy of the second set of backups made while the workload was being processed at the second compute cluster.

4. The method of claim 1 wherein the selected backup policy specifies a time and frequency for backups.

5. The method of claim 1 wherein the first compute cluster is located inside a first converged infrastructure (CI) appliance, and the second compute cluster is located inside a second CI appliance, different from the first CI appliance.

6. The method of claim 1 wherein the partnership indicates that the workload is to be failed over from the first compute cluster to the second compute cluster when the first compute cluster experiences a disruptive event.

7. The method of claim 1 comprising:
obtaining, from the second backup infrastructure, the second complete backups comprising the copy of the first set of backups made while the workload was being processed at the first compute cluster, and the second set of backups made while the workload was being processed at the second compute cluster.

8. A system for backing up a workload, the system comprising:
a processor-based system executed on a computer system and configured to:

define, by a hardware processor, a first hardware island as including at least a first compute cluster;

associate a first backup infrastructure with the first compute cluster;

define a second hardware island as including at least a second compute cluster;

associate a second backup infrastructure with the second compute cluster;

establish a partnership between the first and second compute clusters;

receive, from a user, a selection of a backup policy to be associated with the workload;

copy the selected backup policy into a first folder at the first compute cluster;

copy the selected backup policy into a second folder at the second compute cluster;

create a place holder virtual machine (VM) in the second folder at the second compute cluster;

provision the workload to the first compute cluster for processing by a first VM;

backup, by the first backup infrastructure, the workload being processed at the first compute cluster according to the selected backup policy copied into the first folder at the first compute cluster to generate a first set of backups at the first backup infrastructure;

replicate the first set of backups from the first backup infrastructure to the second backup infrastructure;

maintain the place holder VM in an inactive mode and the selected backup policy in the second folder at the second compute cluster while the workload is being processed at the first compute cluster by the first VM and backed up, by the first backup infrastructure, according to the selected backup policy copied into the first folder at the first compute cluster; and upon the workload being failed over to the second compute cluster, activate the place holder VM to process the workload failed over to the second compute cluster;

initiate a corresponding backup of the workload failed over to the second compute cluster, by the second backup infrastructure, according to the selected backup policy previously copied into the second folder at the second compute cluster to generate a second set of backups at the second backup infrastructure; and replicate the second set of backups from the second backup infrastructure to the first backup infrastructure, wherein the first backup infrastructure thereby comprises first complete backups of the workload, the first complete backups comprising the first set of backups made while the workload was being processed at the first compute cluster, and a copy of the second set of backups made while the workload was being processed at the second compute cluster, and wherein the second backup infrastructure thereby comprises second complete backups of the workload, the second complete backups comprising the second set of backups made while the workload was being processed at the second compute cluster, and a copy of the first set of backups made while the workload was being processed at the first compute cluster.

9. The system of claim 8 wherein the first backup infrastructure is a first site, and the second backup infrastructure is at a second site, remote from the first site.

10. The system of claim 8 wherein the processor-based system is configured to:
obtain, from the first backup infrastructure, the first complete backups comprising the first set of backups made while the workload was being processed at the first compute cluster, and the copy of the second set of backups made while the workload was being processed at the second compute cluster.

11. The system of claim 8 wherein the selected backup policy specifies a time and frequency for backups.

12. The system of claim 8 wherein the first compute cluster is located inside a first converged infrastructure (CI) appliance, and the second compute cluster is located inside a second CI appliance, different from the first CI appliance.

13. The system of claim 8 wherein the partnership indicates that the workload is to be failed over from the first compute cluster to the second compute cluster when the first compute cluster experiences a disruptive event.

14. The system of claim 8 wherein the processor-based system is configured to:
obtain, from the second backup infrastructure, the second complete backups comprising the copy of the first set of backups made while the workload was being processed at the first compute cluster, and the second set of backups made while the workload was being processed at the second compute cluster.

15. A computer program product, comprising a non-transitory computer-readable medium having a computer-readable program code embodied therein, the computer-readable program code adapted to be executed by one or more processors to implement a method comprising:
defining, by a hardware processor, a first hardware island as including at least a first compute cluster;
associating a first backup infrastructure with the first compute cluster;
defining a second hardware island as including at least a second compute cluster;
associating a second backup infrastructure with the second compute cluster;
establishing a partnership between the first and second compute clusters;
receiving, from a user, a selection of a backup policy to be associated with a workload;
associating a first folder at the first compute cluster with the selected backup policy;
associating a second folder at the second compute cluster with the same selected backup policy;
creating a place holder virtual machine (VM) in the second folder;
provisioning the workload to the first compute cluster for processing by a first VM at the first compute cluster;
maintaining the place holder VM in a standby mode and the association of the second folder with the selected backup policy while the workload is being processed at the first compute cluster by the first VM and backed up, by the first backup infrastructure, according to the selected backup policy associated with the first folder at the first compute cluster;
upon the workload being failed over to the second compute cluster, activating the place holder VM to process the workload and initiating a corresponding backup, by the second backup infrastructure, according to the selected backup policy associated with the second folder at the second compute cluster;
replicating first backups of the workload being processed at the first compute cluster from the first backup infrastructure to the second backup infrastructure, the first backups being local backups with respect to the first backup infrastructure; and
when the workload is failed over to the second compute cluster,
backing up the failed over workload, by the second backup infrastructure, according to the selected backup policy associated with the second folder at the second compute cluster to generate second backups of the workload; and
replicating the second backups of the failed over workload from the second backup infrastructure to the first backup infrastructure, the second backups being remote backups with respect to the first backup infrastructure, the first backup infrastructure thereby comprising both local backups of the workload made while the workload was being processed at the first compute cluster, and remote backups of the workload made while the workload was being processed at the second compute cluster.

16. The computer program product of claim 15 wherein the first backup infrastructure is a first site, and the second backup infrastructure is at a second site, remote from the first site.

17. The computer program product of claim 15 wherein the first compute cluster is located inside a first converged infrastructure (CI) appliance, and the second compute cluster is located inside a second CI appliance, different from the first CI appliance.

18. The computer program product of claim 15 wherein the partnership indicates that the workload is to be failed over from the first compute cluster to the second compute cluster when the first compute cluster experiences a disruptive event.

19. The computer program product of claim 15 wherein the method comprises:
obtaining a complete listing of backups from one of the first or second backup infrastructure, wherein each backup of the complete listing was made according to the selected backup policy, and the complete listing includes backups made by the first backup infrastructure while the workload was being processed by the first compute cluster, and backups made by the second backup infrastructure while the workload was being processed by the second compute cluster.

* * * * *